(12) United States Patent
Jin

(10) Patent No.: US 9,491,815 B2
(45) Date of Patent: Nov. 8, 2016

(54) LED LUMINAIRE DRIVING CIRCUIT AND METHOD

(71) Applicant: Microsemi Corporation, Aliso Viejo, CA (US)

(72) Inventor: Xiaoping Jin, Orange, CA (US)

(73) Assignee: Microsemi Corporation, Aliso Viejo, CA (US)

( * ) Notice: Subject to any disclaimer, the term of this patent is extended or adjusted under 35 U.S.C. 154(b) by 81 days.

(21) Appl. No.: 14/493,411

(22) Filed: Sep. 23, 2014

(65) Prior Publication Data

US 2015/0091463 A1    Apr. 2, 2015

Related U.S. Application Data

(60) Provisional application No. 61/885,779, filed on Oct. 2, 2013, provisional application No. 61/941,586, filed on Feb. 19, 2014.

(51) Int. Cl.
*H05B 33/08* (2006.01)

(52) U.S. Cl.
CPC ....... *H05B 33/0809* (2013.01); *H05B 33/0827* (2013.01)

(58) Field of Classification Search
None
See application file for complete search history.

(56) References Cited

U.S. PATENT DOCUMENTS

| | | |
|---|---|---|
| 6,369,525 B1 | 4/2002 | Chang et al. |
| 6,504,267 B1 | 1/2003 | Giannopoulos |
| 7,923,943 B2 | 4/2011 | Peker et al. |
| 2004/0066154 A1 | 4/2004 | Ito et al. |
| 2004/0251854 A1 | 12/2004 | Matsuda et al. |
| 2005/0179393 A1 | 8/2005 | Murakami et al. |
| 2006/0119185 A1 | 6/2006 | Steigerwald et al. |
| 2008/0116818 A1 | 5/2008 | Shteynberg et al. |
| 2008/0272743 A1 | 11/2008 | Ackermann et al. |
| 2010/0052568 A1 | 3/2010 | Cohen |
| 2010/0164403 A1 | 7/2010 | Liu |
| 2010/0253302 A1 | 10/2010 | Otte et al. |
| 2010/0283322 A1 | 11/2010 | Wibben |
| 2011/0068700 A1 | 3/2011 | Fan |
| 2011/0248638 A1* | 10/2011 | Aso ............ H05B 33/0809 315/185 R |
| 2012/0062147 A1* | 3/2012 | Fan ............ H05B 33/0815 315/297 |
| 2012/0217898 A1* | 8/2012 | Pansier ........ H05B 33/0815 315/297 |
| 2015/0002042 A1* | 1/2015 | Kim ............ H05B 33/0824 315/223 |

FOREIGN PATENT DOCUMENTS

| | | |
|---|---|---|
| WO | 2009/019634 A1 | 2/2009 |
| WO | 2009/060400 A1 | 5/2009 |

\* cited by examiner

*Primary Examiner* — Douglas W Owens
*Assistant Examiner* — James H Cho
(74) *Attorney, Agent, or Firm* — Simon Kahn

(57) ABSTRACT

A resonant converter is provided with a plurality of secondary transformer windings. A first secondary winding provides a fixed output, which is utilized to control the switching frequency of the resonant converter. A second secondary winding drives one or more LED luminaires, and is provided with a secondary side resonant circuit. When the feedback from the first output calls for a reduced frequency so as to increase the output, the reduced frequency results in an increased impedance of the secondary side resonant circuit so as to prevent any voltage rise for the LED luminaires. When the feedback from the first output calls for an increased frequency so as to reduce the output, the increased frequency results in an decreased impedance of the secondary side resonant circuit so as to prevent any voltage fall for the LED luminaires.

13 Claims, 17 Drawing Sheets

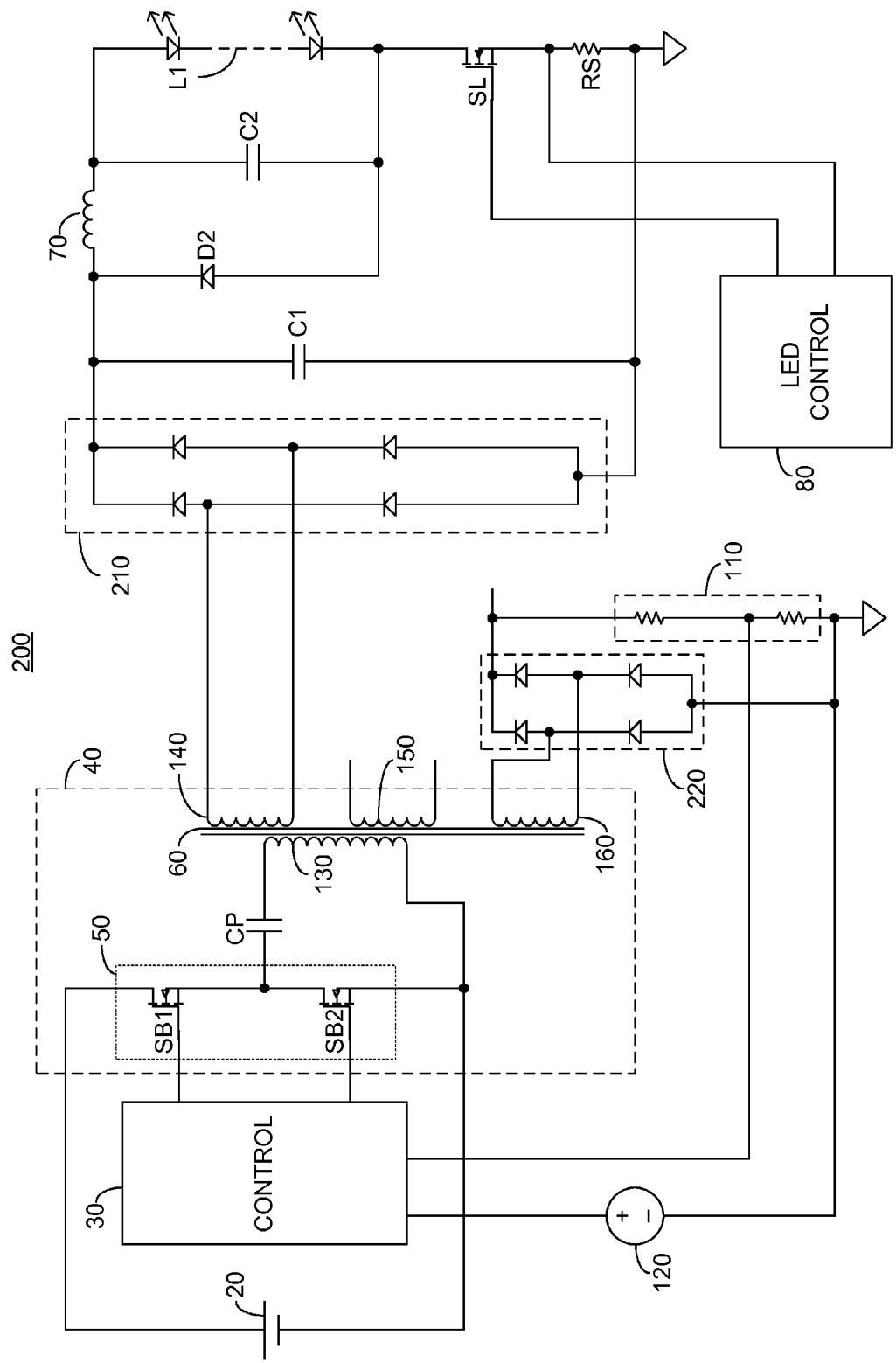
FIG. 2  *PRIOR ART*

LED LUMINAIRE DRIVING CIRCUIT AND METHOD

TECHNICAL FIELD

The present invention relates to the field of light emitting diode (LED) drivers, and in particular to an arrangement wherein a single secondary winding is utilized to provide both a fixed output and drive for at least one LED based luminaire.

BACKGROUND OF THE INVENTION

LED based luminaires are rapidly replacing both incandescent and fluorescent luminaires for both general lighting and backlighting applications. In large liquid crystal based monitors, and in large solid state lighting applications, such as street lighting and signage, typically the LEDs are supplied in one or more strings of serially connected LEDs, which thus share a common current. A plurality of parallel strings may also be supplied.

The power supply which is to drive the LEDs preferably also supplies power to the operating circuitry of the device, thus reducing cost. Typically a single power supply comprising a power transformer with a plurality of secondary windings is utilized, the primary stage of which is controlled by a feedback circuit to provide a fixed direct current (DC) voltage for the operating circuitry of the device through a particular one of the secondary windings.

A resonant converter is a switching converter that comprises a tank circuit actively participating in determining input to output power flow. Power flow in a resonant converter is typically controlled either by changing the switching frequency, or the duty cycle, or both. In one embodiment two reactive elements, i.e. a capacitor and an inductor form the tank circuit, and such a resonant inverter is known as an LC inverter. A resonant converter comprises a resonant inverter, which has a switching network and a resonant tank circuit, and a rectifier circuit.

A resonant converter having two inductive elements, and a single capacitor in the tank circuit, where one of the inductive elements is arranged in parallel with the load, and another inductive element is in series with the load and the capacitor, is known as an LLC converter. Advantageously, an LLC converter exhibits a pair of resonant peaks, each associated with a particular one of the inductors. When properly designed, an LLC converter can be simply controlled by adjusting the frequency responsive to an output feedback, as long as the operating frequency is kept between the two resonant peak frequencies. Typically, a drop in output is compensated for by decreasing the operating frequency, and an increase in output is compensated for by increasing the operating frequency.

In a typical embodiment, the two inductors are implemented in an integrated transformer having a leakage inductance where the inductance of the primary winding acts as the parallel inductive element and the leakage inductance acts as the series inductive element. The transformer further enables scaling of the design output voltage based on the turns ratio of the primary and secondary windings of the integrated transformer.

In order to reduce cost, it is desired to have a single converter provide drive for both the LEDs and for the operating circuits of the device. Since the voltage for the operating circuits of the device must be well regulated, the LED drive voltage is not well regulated. One solution of a circuit 10 for driving at least one LED luminaire offered by the prior art is illustrated in FIG. 1. Circuit 10 comprises: a power source 20; a resonant mode controller 30, optionally comprising an LLC controller; a converter 40 comprising a bridge circuit 50, a primary side capacitance element CP and a transformer 60; a pair of unidirectional electronic valves D1; a unidirectional electronic valve D2; an inductance element 70; a capacitance element C1; a capacitance element C2; an electronically controlled switch SS; a plurality of LED luminaires, denoted respectively L1, L2 and L3; a plurality of electronically controlled switches SL; a plurality of sense resistive elements RS; an LED controller 80; a pair of unidirectional electronic valves D3; a voltage divider 110; and a reference voltage source 120. Bridge circuit 50 comprises a pair of electronically controlled switches, denoted respectively SB1 and SB2. Transformer 60 comprises: a primary winding 130; and a plurality of secondary windings, denoted respectively 140, 150 and 160.

In one embodiment, primary side capacitance element CP, capacitance element C1 and capacitance element C2 are each implemented as a capacitor, and are described herein as such. In another embodiment, unidirectional electronic valves D1, D2 and D3 are each implemented as a diode, and are described herein as such. In one embodiment, inductance element 70 is implemented as an inductor, and is described herein as such. In another embodiment, each sense resistive element RS is implemented as a resistor, and is described herein as such. In one embodiment, electronically controlled switches SB1, SB2, SS and SL are each implemented as an n-channel metal-oxide-semiconductor field-effect-transistor (NFET), and are described herein as such.

The output of power source 20 is coupled to the drain of NFET SB1 and the return of power source 20 is coupled to the source of NFET SB2. The gates of NFETs SB1, SB2 are each coupled to a respective output of resonant mode controller 30. The source of NFET SB1 is coupled to the drain of NFET SB2 and a first end of primary side capacitor CP. A second end of primary side capacitor CP is coupled to a first end of primary winding 130 of transformer 60 of converter 40. A second end of primary winding 130 is coupled to the return of power source 20. A first and second end of secondary winding 140 of transformer 60 are each coupled to the anode of a respective one of pair of diodes D1 and the center tap of secondary winding 140 is coupled to a common potential.

The cathodes of diodes D1 are each coupled to a first end of inductor 70 and to a first end of capacitor C1. The second end of capacitor C1 is coupled to the common potential. The second end of inductor 70 is coupled to the drain of NFET SS and the anode of diode D2. The source of NFET SS is coupled to the common potential and the gate of NFET SS is coupled to an output of LED controller 80. The cathode of diode D2 is coupled to a first end of capacitor C2 and the anode end of each of LED luminaires L1, L2, L3. The second end of capacitor C2 is coupled to the common potential. The cathode end of each of LED luminaires is coupled to the drain of a respective NFET SL and to a respective input of LED controller 80. The source of each NFET SL is coupled to a first end of a respective sense resistor RS and a respective input of LED controller 80. The second end of each sense resistor RS is coupled to the common potential and the gate of each NFET SL is coupled to a respective output of LED controller 80.

Secondary winding 150 is coupled to a respective load (not shown). Each end of secondary winding 160 is coupled to the anode of a respective diode D3 and the center tap of second winding 160 is coupled to the common potential. The cathode of each diode D3 is coupled to a load (not shown)

and a first end of voltage divider 110. A second end of voltage divider 110 is coupled to the common potential and a division junction of voltage divider 110 is coupled to a respective input of resonant mode controller 30. The output of reference voltage source 120 is coupled to a respective input of resonant mode controller 30 and the return of reference voltage source 120 is coupled to the common potential.

In operation, resonant mode controller 30 is arranged to alternately open and close NFETs SB1 and SB2 such that primary winding 130 is charged when NFET SB1 is closed and discharged when NFET SB2 is closed. Resonant mode controller 30 typically operates at a fixed duty cycle of near 50%, with a variable frequency, as will be described further. The power supplied to transformer 60 is controlled via secondary winding 160 and voltage divider 110. Particularly, when NFET SB1 is closed and primary winding 130 is charging, power is output from secondary winding 160 via a first diode D3. When NFET SB2 is closed and primary winding 130 is discharging, power is output from secondary winding 160 via the second diode D3. The rectified voltage at the cathodes of diodes D3 is supplied to the load and is additionally divided by voltage divider 110. The divided voltage is compared to the reference voltage output by reference voltage source 120. In the event that the divided voltage is higher than the output of reference voltage source 120, resonant mode controller 30 is arranged to increase the switching frequency of bridge circuit 50 thereby reducing the amount of power supplied to secondary winding 160. In the event that the divided voltage is lower than the output of voltage source 120, resonant mode controller 30 is arranged to reduce the switching frequency of bridge circuit 50 thereby increasing the amount of power supplied to secondary winding 160.

Secondary winding 140 is similarly influenced by the control of resonant mode controller 30. Since the voltage across secondary winding 140 is not independently controlled, the voltage appearing across capacitor C2 needs to be controlled so as to provide an appropriate operating voltage for LED luminaires L1, L2, L3. The operation of inductor 70, NFET SS and diode D2 act as a boost converter to increase the output voltage of secondary winding 140, stored across capacitor C1. Particularly, when NFET SS is closed, inductor 70 is charged by secondary winding 140. When NFET SS is open, capacitor C2 is charged and LED luminaires L1, L2, L3 are powered by the combination of the power supplied by secondary winding 140 and the power stored on inductor 70. LED luminaires L1, L2, L3 are thus powered at a voltage greater than the voltage provided by secondary winding 140. LED controller 80 is arranged to detect the voltage at the cathode end of each LED luminaire L1, L2, L3 and compare the detected voltages to a predetermined reference voltage. In the event that one or more of the detected voltages are lower than the predetermined reference voltage, i.e. the voltage across capacitor C2 is less than the optimal operating voltages of at least one of LED luminaires L1, L2, L3, LED controller 80 is arranged to increase the duty cycle of the boost converter, i.e. increase the percentage of time that NFET SS is closed. The voltage across capacitor C2 thus increases.

The current flowing through each of LED luminaires L1, L2, L3 generates a voltage across the respective sense resistor RS, which is detected by LED controller 80. In one embodiment, LED controller 80 is arranged to adjust the pulse width modulation (PWM) duty cycle of each NFET SL to control the current flowing through each LED luminaire L1, L2, L3. In another embodiment, LED controller 80 is arranged to adjust the gate voltage of each NFET SL to thereby adjust the current flowing through the respective one of LED luminaires L1, L2, L3, by increasing the effective voltage drop across the respective NFET SL. Any excess power is dissipated across the NFET SL. LED controller 80 may be a single unit controlling both NFET SS and the respective NFET SLs, or may be separate control units without exceeding the scope.

Another solution of a circuit 200 for driving at least one LED luminaire offered by the prior art is illustrated in FIG. 2. Circuit 200 comprises: power source 20; resonant mode controller 30; converter 40 comprising bridge circuit 50, primary side capacitor CP and transformer 60; capacitor C1; diode D2; inductor 70; capacitor C2; LED luminaire L1; NFET SL; sense resistor RS; LED controller 80; voltage divider 110; reference voltage source 120; and a pair of rectifier bridges, denoted respectively 210 and 220. A single LED luminaire is illustrated, however this is not meant to be limiting in any way and any number of LED luminaires may be provided. Bridge circuit 50 comprises NFETs SB1 and SB2. Transformer 60 comprises: primary winding 130; and plurality of secondary windings 140, 150 and 160. In one embodiment, rectifier bridges 210 and 220 are each implemented as a diode bridge, and are described herein as such.

The output of power source 20 is coupled to the drain of NFET SB1 and the return of power source 20 is coupled to the source of NFET SB2. The gates of NFETs SB1, SB2 are each coupled to a respective output of resonant mode controller 30. The source of NFET SB1 is coupled to the drain of NFET SB2 and a first end of primary side capacitor CP. A second end of primary side capacitor CP is coupled to a first end of primary winding 130 of transformer 60 of converter 40. A second end of primary winding 130 is coupled to the return of power source 20.

Each end of secondary winding 140 of transformer 60 is coupled to a respective input of diode bridge 210 and the return of diode bridge 210 is coupled to a common potential. The output of diode bridge 210 is coupled to a first end of capacitor C1, the cathode of diode D2 and a first end of inductor 70. The second end of capacitor C1 is coupled to the common potential. The second end of inductor 70 is coupled to a first end of capacitor C2 and the anode end of LED luminaire L1. The second end of capacitor C2 is coupled to the anode of diode D2, the cathode end of LED luminaire L1 and the drain of NFET SL. The source of NFET SL is coupled to a first end of sense resistor RS and an input of LED controller 80. The second end of sense resistor RS is coupled to the common potential and the gate of NFET SL is coupled to an output of LED controller 80.

Secondary winding 150 is coupled to a respective load (not shown), or alternatively not provided. Each end of second winding 160 is coupled to a respective input of diode bridge 220 and the return of diode bridge 220 is coupled to the common potential. The output of diode bridge 220 is coupled to a load (not shown) and a first end of voltage divider 110. A second end of voltage divider 110 is coupled to the common potential and a division junction of voltage divider 110 is coupled to a respective input of resonant mode controller 30. The output of reference voltage source 120 is coupled to a respective input of resonant mode controller 30 and the return of reference voltage source 120 is coupled to the common potential.

In operation, resonant mode controller 30 is arranged to alternately open and close NFETs SB1 and SB2, typically at a predetermined duty cycle near 50%. Primary winding 130 is charged when NFET SB1 is closed and discharged when NFET SB2 is closed. The voltage output across diode bridge 200 is controlled by resonant mode controller 30, as described above. Particularly, the voltage across secondary winding 160, rectified by diode bridge 220, is supplied to the load, typically across an output capacitor (not shown) and is additionally divided by voltage divider 110. The divided voltage is compared to the voltage output by reference voltage source 120. In the event that the divided voltage is higher than the output of reference voltage source 120, resonant mode controller 30 is arranged to increase the switching frequency of bridge circuit 50 thereby reducing the amount of power supplied to secondary winding 160. In the event that the divided voltage is lower than the output of voltage source 120, resonant mode controller 30 is arranged to reduce the switching frequency of bridge circuit 50 thereby increasing the amount of power supplied to secondary winding 160.

The output by secondary winding 140 is similarly impacted by the operation of resonance mode controller 30, and thus the voltage across capacitor C1 changes responsive to changes in the load of secondary winding 160. The operation of inductor 70, diode D2 and NFET SL act as a buck converter to reduce the output voltage of secondary winding 140, stored across capacitor C1 to the appropriate voltage for LED luminaire L1. Particularly, when NFET SL is closed, power is provided to LED luminaire L1 by secondary winding 140 and inductor 70 is charged by secondary winding 140. When NFET SL is open, LED luminaire L1 is powered by the power stored on inductor 70. LED luminaire L1 is thus powered at a voltage less than the voltage provided by secondary winding 140 responsive to the duty cycle of NFET SL as controlled by LED controller 80.

The current flowing through LED luminaire L1 generates a voltage across the respective sense resistor RS, which is detected by LED controller 80. LED controller 80 is arranged to adjust the pulse width modulation (PWM) duty cycle of NFET SL to control the current flowing through LED luminaire L1. Additionally, the PWM adjustment of NFET SL adjusts the duty cycle of the buck converter of inductor 70, diode D2 and NFET SL, thus adjusting the voltage provided to LED luminaire L1 accordingly.

Advantageously, a resonant LED luminaire driving circuit, such as the above described LLC converter circuits 10 and 200, automatically provides for zero voltage switching for the LLC switching elements. However, the above converter circuits 10, 200 require an additional inductor 70. Additionally, NFETs SS and SL are operated in hard switching mode. What is desired, and not provided by the prior art, is an integrated converter which provides both a regulated voltage for use by operating circuits, and a regulated LED drive voltage, without requiring the additional inductors, dissipative regulators, or hard switching of the prior art.

SUMMARY OF THE INVENTION

Accordingly, it is a principal object of the present invention to overcome at least some of the disadvantages of the prior art. This is provided in one embodiment by a first circuit for driving at least one light emitting diode (LED) luminaire, the circuit comprising: a resonant mode controller; a converter comprising a transformer having a primary winding and a plurality of secondary windings each magnetically coupled to the primary winding, a bridge circuit arranged to switch responsive to the resonant mode controller, and a primary side capacitor coupled to the primary winding; a first output associated with a first of the plurality of secondary windings, the resonant mode controller arranged to adjust the switching frequency of the bridge circuit so as to maintain the first output at a predetermined level; a second output associated with a second of the plurality of secondary windings; a secondary side capacitance element arranged in series between the second of the plurality of secondary windings and the second output; an LED controller; a first LED luminaire arranged to provide a first illumination responsive to a power signal on the second output; and a first current regulator arranged to regulated current flowing through the first LED luminaire responsive to the LED controller.

In another embodiment, a second circuit for driving an LED luminaire is provided, the second circuit comprising: a primary side controller; a flyback converter comprising a transformer having a primary winding and a plurality of secondary windings each magnetically coupled to the primary winding, and a primary electronically controlled switch, the primary electronically controlled switch arranged to alternately open and close responsive to the primary side controller, the open and closed state arranged to adjust a current flowing through the primary winding; a first output associated with a first of the plurality of secondary windings, the primary side controller arranged to alternately open and close the primary electronically controlled switch so as to maintain the first output at a predetermined voltage level; a first unidirectional electronic valve arranged between the first secondary winding and the first output; a second output associated with a second of the plurality of secondary windings; an LED controller; a first secondary electronically controlled switch arranged to be alternately in a closed state and an open state responsive to the LED controller; and a first LED luminaire coupled to the second output and arranged in cooperation with the first secondary electronically controlled switch so as to provide a first illumination responsive to a power signal on the second output when the first secondary electronically controlled switch is in a first of the open and closed states and not provide the first illumination when the first secondary electronically controlled switch is in a second of the open and closed states wherein the turns ratio of the first secondary winding and the second secondary winding is such that power is delivered to the first output via the first unidirectional electronic valve only when the first secondary electronically controlled switch is switched to the second of the open and closed states.

Additional features and advantages of the invention will become apparent from the following drawings and description.

BRIEF DESCRIPTION OF THE DRAWINGS

For a better understanding of the invention and to show how the same may be carried into effect, reference will now be made, purely by way of example, to the accompanying drawings in which like numerals designate corresponding elements or sections throughout.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawing:

FIG. 2 illustrates a high level schematic diagram of a buck mode LED luminaire driving circuit, according to the prior art;

DETAILED DESCRIPTION OF PREFERRED EMBODIMENTS

Figure 1:
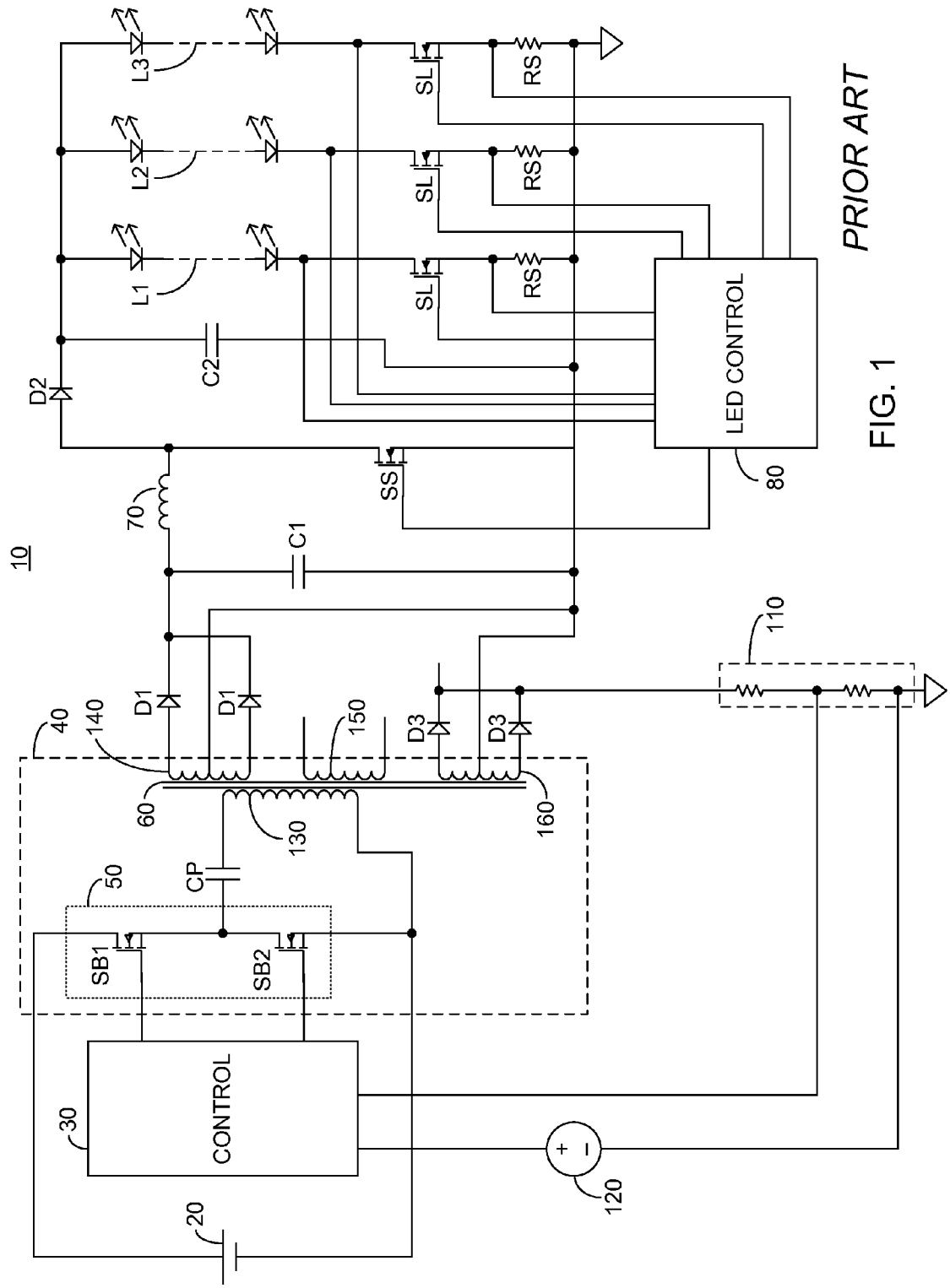
FIG. 1 illustrates a high level schematic diagram of a boost mode LED luminaire driving circuit, according to the prior art.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

Figure 3A:
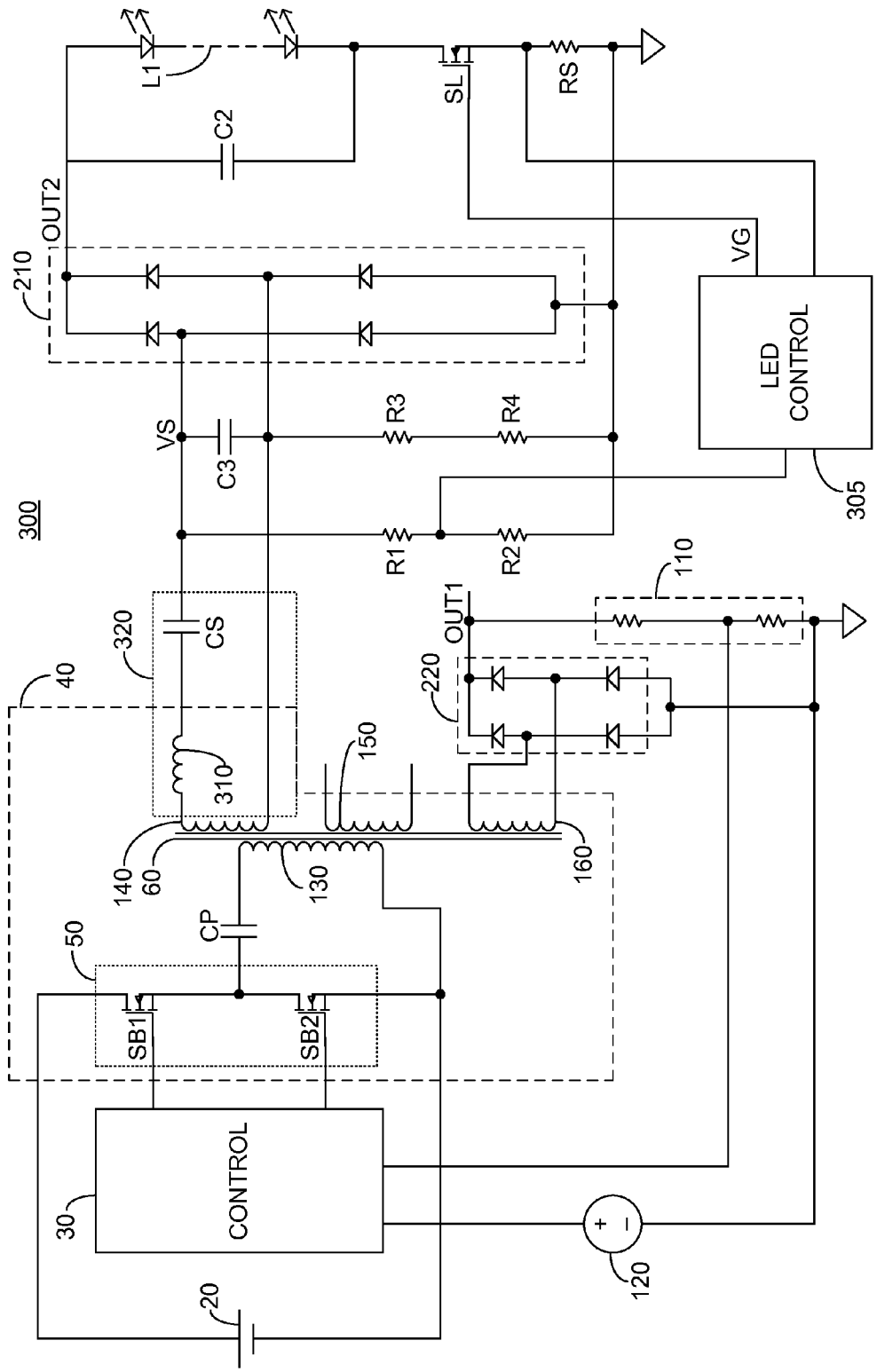
FIG. 3A illustrates a high level schematic diagram of a synchronous buck mode LED luminaire driving circuit, according to certain embodiments.

FIG. 3A illustrates a high level schematic diagram of an LED luminaire driving circuit 300, according to certain embodiments. Circuit 300 comprises: power source 20; resonant mode controller 30; converter 40 comprising bridge circuit 50, primary side capacitor CP and transformer 60; a secondary side capacitance element CS; voltage divider 110; reference voltage source 120; diode bridge 210; diode bridge 220; an LED controller 305; capacitor C2; a capacitance element C3; LED luminaire L1; NFET SL; sense resistor RS; and a plurality of resistive elements R1, R2, R3 and R4. A single LED luminaire is illustrated, however this is not meant to be limiting in any way and any number of LED luminaires may be provided without exceeding the scope. Bridge circuit 50 comprises NFETs SB1 and SB2. Transformer 60 comprises: primary winding 130; and secondary windings 140, 150 and 160, with secondary winding 150 being optional. Secondary winding 140 exhibits a leakage inductance 310 in series therewith. In one embodiment, each of resistive elements R1, R2, R3 and R4 are implemented as resistors, and are described herein as such. The combined resistance of resistors R3 and R4 equals the combined resistance of resistors R1 and R2. Secondary side capacitance CS and capacitance element C3 are each in one embodiment implemented as a capacitor, and are described herein as such.

The output of power source 20 is coupled to the drain of NFET SB1 and the return of power source 20 is coupled to the source of NFET SB2. The gates of NFETs SB1, SB2 are each coupled to a respective output of resonant mode controller 30. The source of NFET SB1 is coupled to the drain of NFET SB2 and a first end of primary side capacitor CP. A second end of primary side capacitor CP is coupled to a first end of primary winding 130 of transformer 60 of converter 40. A second end of primary winding 130 is coupled to the return of power source 20.

A first end of secondary winding 140 is coupled to a first end of leakage inductance 310, and a second end of leakage inductance 310 is coupled to a first end of secondary side capacitor CS. The second end of secondary side capacitor CS is coupled to a first input of diode bridge 210, a first end of resistor R1 and a first end of capacitor C3, denoted node VS. The second end of secondary winding 140 is coupled to a second input of diode bridge 210, a second end of capacitor C3 and a first end of resistor R3. A second end of resistor R1 is coupled to a first end of resistor R2 and a respective input of LED controller 305. A second end of resistor R2 is coupled to a common potential. A second end of resistor R3 is coupled to a first end of resistor R4 and a second end of resistor R4 is coupled to the common potential. The return of diode bridge 210 is coupled to the common potential. The output of diode bridge 210, denoted OUT2, is coupled to a first end of capacitor C2 and the anode end of LED luminaire L1. The second end of capacitor C2 is coupled to the cathode end of LED luminaire L1 and the drain of NFET SL. The source of NFET SL is coupled to a first end of sense resistor RS and a respective input of LED controller 305. The second end of sense resistor RS is coupled to the common potential and the gate of NFET SL is coupled to an output of LED controller 305.

Optional secondary winding 150 is coupled to a respective load (not shown). Each end of secondary winding 160 is coupled to a respective input of diode bridge 220 and the return of diode bridge 220 is coupled to the common potential. The output of diode bridge 220, denoted OUT1, is coupled across an output capacitor to a load (not shown) and a first end of voltage divider 110. A second end of voltage divider 110 is coupled to the common potential and a division junction of voltage divider 110 is coupled to a respective input of resonant mode controller 30. The output of reference voltage source 120 is coupled to a respective input of resonant mode controller 30 and the return of reference voltage source 120 is coupled to the common potential.

In operation, resonant mode controller 30 is arranged to alternately open and close NFETs SB1 and SB2, typically at a predetermined duty cycle near 50%. The primary winding 130 is charged when NFET SB1 is closed and discharged when NFET SB2 is closed. The voltage appearing across the load coupled to secondary winding 160 is controlled via the feedback path of voltage divider 110, as described above. Particularly, the voltage across secondary winding 160, rectified by diode bridge 220, is supplied to the load and is additionally divided by voltage divider 110. The divided voltage is compared to the voltage output by reference voltage source 120. In the event that the divided voltage is higher than the output of reference voltage source 120, resonant mode controller 30 is arranged to increase the switching frequency of bridge circuit 50 thereby reducing the amount of voltage to the load coupled to secondary winding 160. In the event that the divided voltage is lower than the output of voltage source 120, resonant mode controller 30 is arranged to reduce the switching frequency of bridge circuit 50 thereby increasing the amount of voltage to the load couplet to secondary winding 160.

Secondary winding 140 is similarly impacted by the change in frequency of resonant mode controller 30. Leakage inductance 310 and secondary side capacitor CS form a resonant circuit 320. Transformer 60 and secondary side capacitor CS are provided such that the resonant frequency of resonant circuit 320 is greater than the maximum switching frequency of converter 40. As a result, when resonant mode controller 30 reduces the switching frequency of converter 40, in order to increase the voltage at secondary winding 160, the switching frequency becomes further distanced from the resonant frequency of resonant circuit 320 and as a result the impedance of resonant circuit 320 increases. Thus, the increase in electrical energy caused by the reduction in switching frequency is compensated for by the increased impedance of resonant circuit 320 and the rectified voltage at output OUT2 of diode bridge 210 doesn't appreciably increase.

Similarly, when resonant mode controller 30 increases the switching frequency of converter 40, in order to reduce the voltage at secondary winding 160, the switching frequency approaches the resonant frequency of resonant circuit 320, and as a result the impedance of resonant circuit 320 decreases. Thus, the decrease in electrical energy caused by the increase in switching frequency is compensated for by the reduced impedance of resonant circuit 320 and the rectified voltage at output OUT2 of diode bridge 210 doesn't appreciably decrease.

Figure 3B:
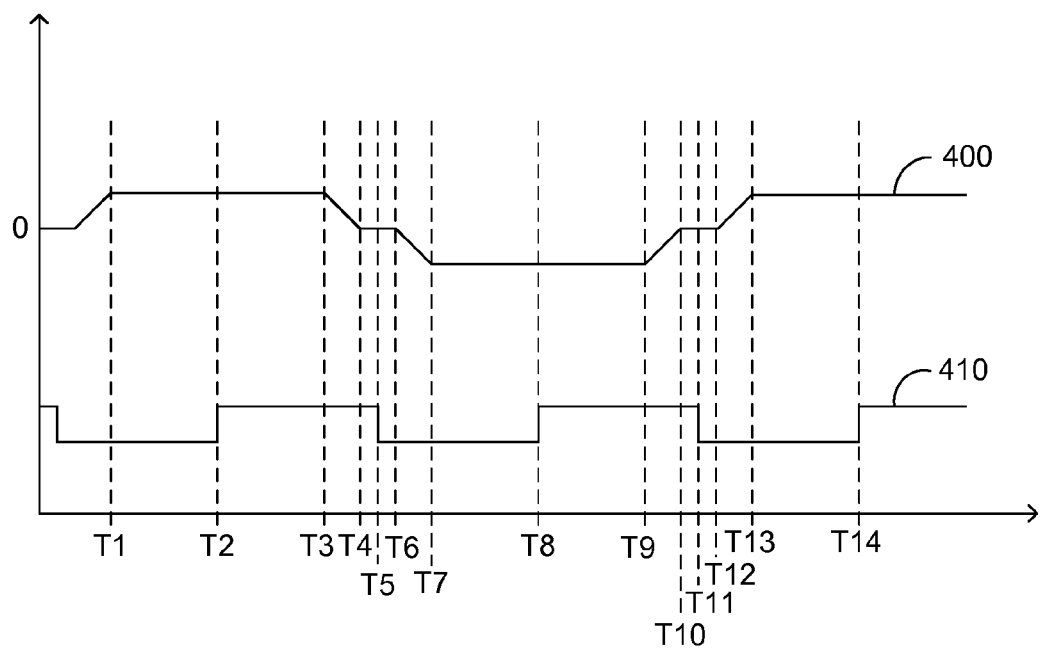
FIGS. 3B-3C illustrate waveforms of certain components of the LED luminaire driving circuit of FIG. 3A.
Figure 3C:
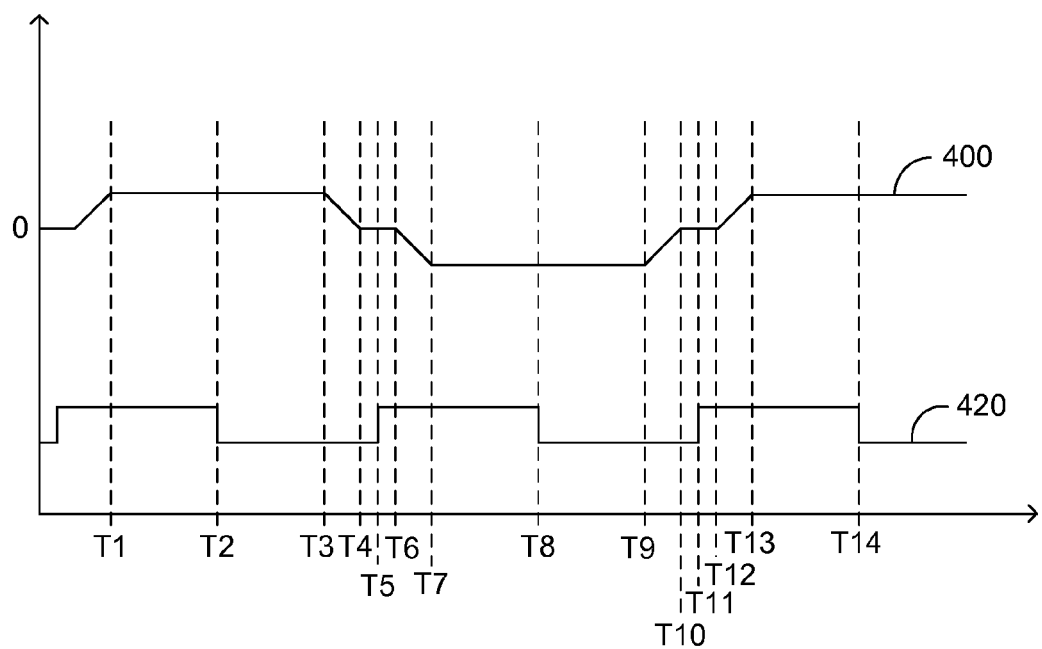

The current flowing through LED luminaire L1 generates a voltage across sense resistor RS, which is detected by LED controller 305. LED controller 305 is arranged to adjust the pulse width modulation (PWM) duty cycle of NFET SL to control the current flowing through LED luminaire L1 responsive to the detected voltage drop across sense resistor RS. LED controller 305 is arranged to be synchronized with the voltage across secondary winding 160, as illustrated in FIGS. 3-3C where the x-axis represents time and the y-axis represents voltage in arbitrary units. The voltage across secondary winding 140, stored across capacitor C3, is denoted VS and illustrated by graph 400 in FIGS. 3B-3C. Voltage VS is divided by resistors R1 and R2, the divided voltage received by LED controller 305. In one embodiment, the gate voltage of NFET SL, denoted VG and illustrated by graph 410 of FIG. 3B, is synchronized with voltage VS with leading edge modulation, as will be described below. In another embodiment, the gate voltage of NFET SL, denoted VG and illustrated by graph 420 of FIG. 3C, is synchronized with voltage VS with trailing edge modulation, as will be described below.

For leading edge modulation, as illustrated in FIG. 3B, NFET SL is opened when voltage VS, illustrated by graph 400, is zero. At time T1, NFET SB1 is closed and voltage VS rises to the positive operating voltage. At time T2, LED controller 305 is arranged to output a high gate voltage VG to NFET SL, illustrated by graph 410, thereby closing NFET SL and allowing current to flow through LED luminaire L1. At time T3, NFET SB1 is opened and voltage VS begins to fall responsive to the opening of NFET SB1. Additionally, the inductive current stored in leakage inductance 310 of secondary winding 140 starts flowing, i.e. freewheeling, through LED luminaire L1 and decays. At time T4, when both NFET SB1 and NFET SB2 are opened, voltage VS becomes zero. NFET SB1 and NFET SB2 are maintained in an open position for a predetermined time period to avoid a condition where NFET SB1 and NFET SB2 are closed at the same time, thereby short circuiting power source 20, a condition known as shoot through. At time T5, LED controller 305 is arranged to switch gate voltage VT to a low gate voltage VG for NFET SL thereby opening NFET SL when substantially zero voltage is presented thereacross, thereby reducing switching losses. Additionally, transformer 60 is designed such that leakage inductance 310 is of an appropriate value so that the inductive current thereof decays to zero, or near-zero, at time T5, thus realizing a soft switching operation, i.e. switching at zero voltage and zero current. At time T6, NFET SB2 is closed and voltage VS begins to fall. At time T7, voltage VS falls to the negative operating voltage and at time T8 LED controller 305 is arranged to switch gate voltage VG to a high gate voltage VG for application to NFET SL. At time T9, NFET SB1 is opened and voltage VS begins to rise responsive to NFET SB1 being opened. At time T10, when both NFET SB1 and SB2 are opened, voltage VS becomes zero. At time T11, LED controller 305 is arranged to switch the output gate voltage VG a low gate voltage for application to NFET SL thereby opening NFET SL when substantially zero voltage is presented thereacross. At time T12, NFET SB1 is closed and voltage VS begins to rise. At time T13 voltage VS rises to the positive operating voltage and at time T14 LED controller 305 is arranged to switch the output gate voltage VG to high for application to NFET SL.

For trailing edge modulation, illustrated in FIG. 3C, NFET SL is closed when voltage VS, illustrated by graph 400, is zero. At time T1, NFET SB1 is closed and voltage VS rises to the positive operating voltage. At time T2, LED controller 305 is arranged to output a low gate voltage VG to NFET SL, illustrated by graph 420, thereby opening NFET SL and preventing current from flowing through LED luminaire L1. At time T3, NFET SB1 is opened and voltage VS begins to fall responsive to the opening of NFET SB1. At time T4, when both NFET SB1 and NFET SB2 are opened, voltage VS becomes zero. NFET SB1 and NFET SB2 are maintained in an open position for a predetermined time period to avoid shoot-through condition where NFET SB1 and NFET SB2 are closed at the same time, thereby short circuiting power source 20. At time T5, LED controller 305 is arranged to switch the output gate voltage VG to a high value for application to NFET SL thereby closing NFET SL when substantially zero voltage is presented, thus resulting in soft switching. At time T6, NFET SB2 is closed and voltage VS begins to fall. At time T7, voltage VS falls to the negative operating voltage and at time T8 LED controller 305 is arranged to switch the output gate voltage VG to a low value for application to NFET SL, thereby opening NFET SL. The inductive current of leakage inductance 310 of secondary winding 140 thus freewheels through capacitor C3 and secondary side capacitor CS, the stored inductive energy of leakage inductance 310 being transferred to capacitor C3 and secondary side capacitor CS as the freewheeling current degrades. At time T9, NFET SB1 is opened and voltage VS begins to rise responsive to the opening of NFET SB1 opens. At time T10, when both NFET SB1 and SB2 are opened, voltage VS becomes zero. At time T11, LED controller 305 is arranged to switch the output gate voltage VG to a high value for application to NFET SL thereby closing NFET SL when substantially zero voltage is presented thereacross. At time T12, NFET SB1 is closed and voltage VS begins to rise. At time T13 voltage VS rises to the positive operating voltage and at time T14 LED controller 305 is arranged to switch the output gate voltage VG to a low value for application to NFET SL, thereby opening NFET SL. The inductive current of leakage inductance 310 of secondary winding 140 thus freewheels through capacitor C3 and secondary side capacitor CS, the stored inductive energy of leakage inductance 310 being transferred to capacitor C3 and secondary side capacitor CS as the freewheeling current degrades.

Resistors R3 and R4 are arranged to balance the resistance provided by resistors R1 and R2, such that the resistance at the inputs of diode bridge 210, i.e. across both ends of secondary winding 140 are equal. Resistors R3 and R4 are illustrated as being separate resistors, however this is not meant to be limiting in any way and in another embodiment the combined resistance of resistors R3 and R4 is provided by a single resistor.

Advantageously, as opposed to LED luminaire driving circuits 10, 200, LED luminaire driving circuit 300 does not include a secondary side inductor 70. Particularly, the buck function is provided by NFET SL, sense resistor RS and leakage inductance 310 of secondary winding 140. Additionally, NFET SL is either switched to be opened, or switched to be closed, when substantially zero voltage is presented thereacross. Thus, soft switching occurs at one of the two switching transitions.

The above has been described in an embodiment where the illumination of LED luminaire L1 is regulated by pulse width modulation switching of NFET SL, however this is not meant to be limiting in any way. In another embodiment (not shown), the current flowing through LED luminaire L1 is regulated by linear regulation of NFET SL, thereby adjusting the voltage drop across NFET SL.

Figure 4A:
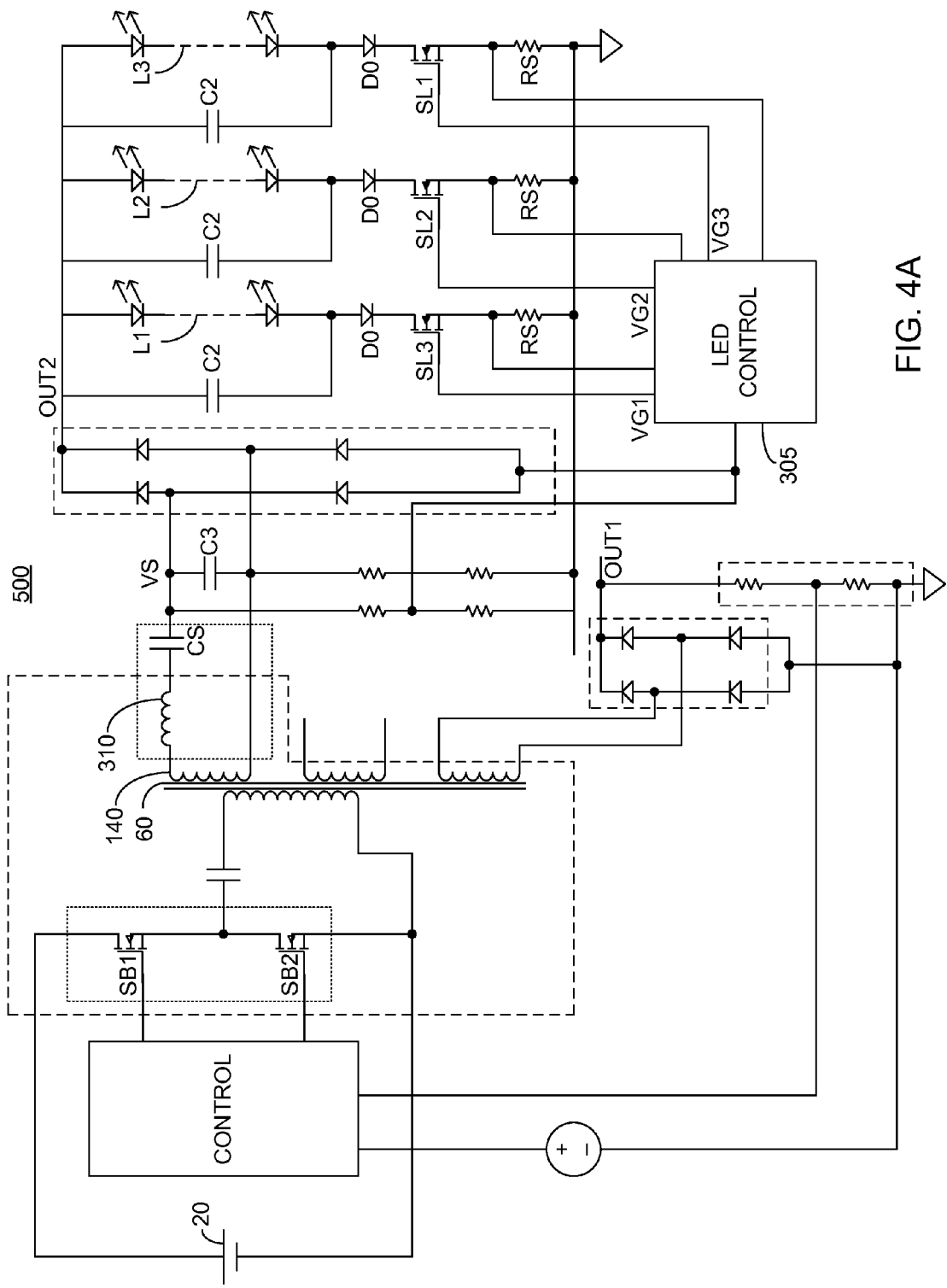
FIG. 4A illustrates a high level schematic diagram of a synchronous buck mode LED luminaire driving circuit, comprising a plurality of LED luminaires, according to certain embodiments.
Figure 4B:
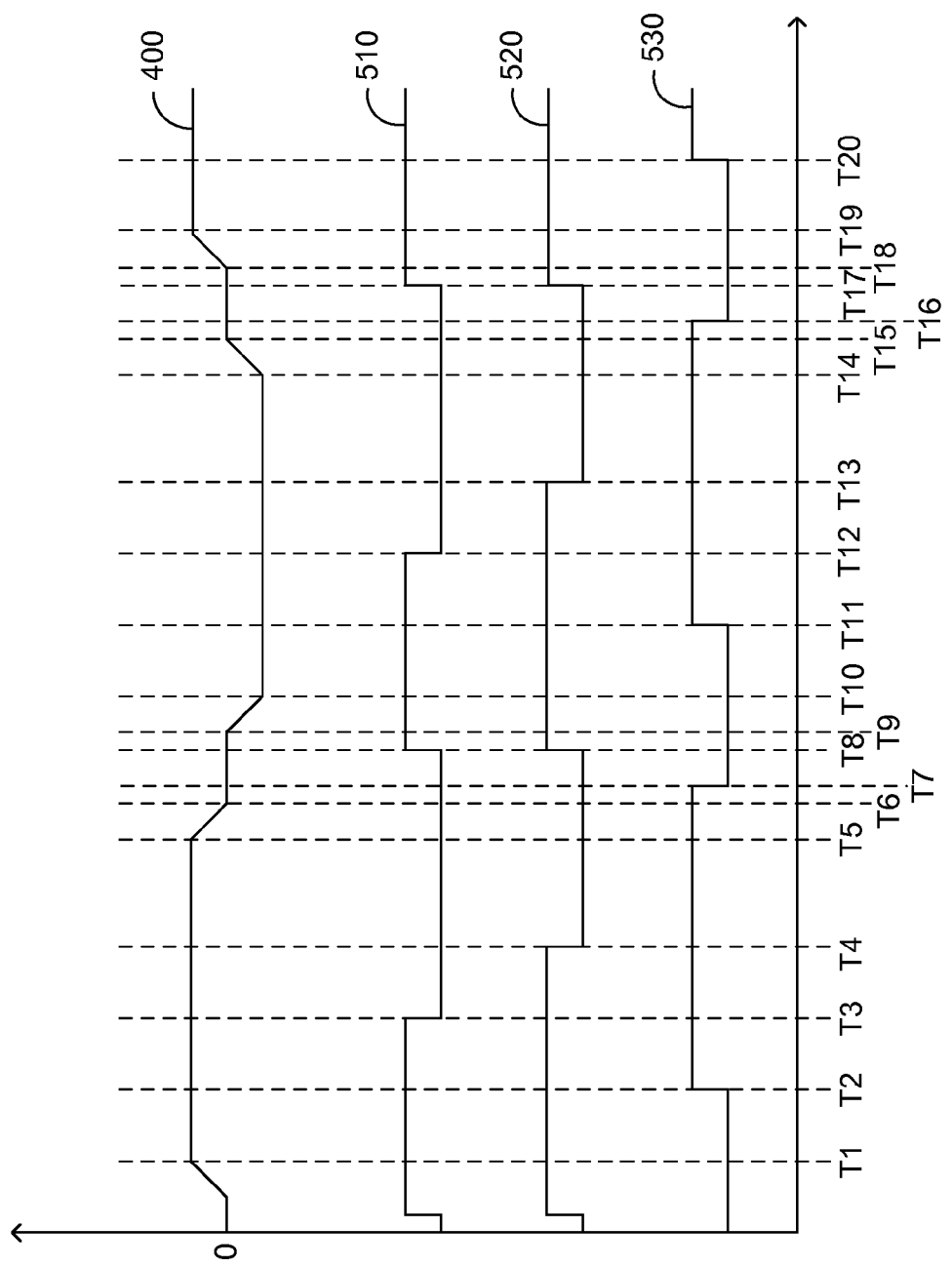
FIG. 4B illustrates waveforms of certain components of the LED luminaire driving circuit of FIG. 4A.

FIG. 4A illustrates a high level schematic diagram of an LED luminaire driving circuit 500, according to certain embodiments. LED luminaire driving circuit 500 is in all respects similar to LED luminaire driving circuit 300 of FIG. 3A, with the exception that a plurality of LED luminaires are provided, denoted respectively L1, L2 and L3. Each one of LED luminaires L1, L2, L3 has associated therewith a respective one of a plurality of NFETs, denoted respectively SL1, SL2 and SL3, a respective one of a plurality of unidirectional electronic valves D0 and a respective one of a plurality of sense resistors RS. In one embodiment, each of the plurality of unidirectional electronic valves D0 comprises a diode, and is described herein as such. The anode of each diode D0 is coupled to the cathode end of the respective one of LED luminaires L1, L2, L3, and the cathode of each diode D0 is coupled to the drain of the respective one of NFETs SL1, SL2, SL3. Diodes D0 prevent cross bleeding of capacitors C2 when more than one of NFETs SL1, SL2, SL3 are simultaneously in a closed state. The operation of LED luminaire driving circuit 500 is in all respects similar to the operation of LED luminaire driving circuit 300 of FIG. 3A, with the exception that the NFETs SL1, SL2 are each driven with trailing edge modulation and NFET SL3 is driven with leading edge modulation, as illustrated in FIG. 4B where the x-axis represents time and the y-axis represents voltage in arbitrary units. The voltage across secondary winding 140 of transformer 60, stored across capacitor C3, is denoted VS and illustrated by graph 400 of FIG. 4B. The gate voltage of NFET SL1 is denoted VG1 and illustrated by graph 510 of FIG. 4B. The gate voltage of NFET SL2 is denoted VG2 and illustrated by graph 520 of FIG. 4B. The gate voltage of NFET SL3 is denoted VG3 and illustrated by graph 530 of FIG. 4B.

LED controller 305 is arranged to determine which one of LED luminaires L1, L2, L3 exhibits the highest operating voltage, by detecting the voltage across the respective sense resistor RS. The highest operating voltage will result in the lowest current flowing through the respective sense resistor RS. In another embodiment (not shown), a respective input of LED controller 305 is coupled to the cathode end of each of LED luminaires L1, L2, L3, LED controller 305 arranged to directly measure the operating voltages of LED luminaires L1, L2, L3. The respective one of NFETs SL1, SL2, SL3 associated with the LED luminaire exhibiting the highest operating voltage is driven with leading edge modulation and the other NFETs are driven with trailing edge modulation. For clarity, the below will be described in an embodiment where LED luminaire L3 exhibits the highest operating voltage, however this is not meant to be limiting in any way.

As illustrated in FIG. 4B, at time T1, NFET SB1 is closed and voltage VS rises to the positive operating voltage. Gate voltages VG1 and VG2 are high and therefore NFETs SL1 and SL2 are closed and current flows through LED luminaires L1 and L2. At time T2, LED controller 305 is arranged to switch the output gate voltage VG3 to high for application to NFET SL3 thereby closing NFET SL3. Since LED luminaire L3 exhibits a higher operating voltage than LED luminaires L1 and L2, the voltage thereacross will not be sufficient to power LED luminaire L3 until both LED luminaires L1 and L2 are turned off, however the overlapping of on time of LED luminaire L3 with the on time of LED luminaires L1 and L2 will allow the continuation of the flow of inductive current of leakage inductance 310 of secondary winding 140 to through LED luminaire L3, instead of capacitor C3 and secondary side capacitor CS, and thus minimizing the energy circulation loss and switching stress when LED luminaires L1 and L2 are turned off.

At time T3, LED controller 305 is arranged to switch the output gate voltage VG1 to a low state for application to NFET SL1 thereby opening NFET SL1 and preventing current from flowing through LED luminaire L1. At time T4, LED controller 305 is arranged to switch the output gate voltage VG2 to a low state for application to NFET SL2 thereby opening NFET SL2 and preventing current from flowing through LED luminaire L2. The voltage across LED luminaire L3 rises responsive to the current drive from secondary winding 140 to the necessary operating voltage for LED luminaire L3 and current flows therethrough. At time T5, NFET SB1 is opened and voltage VS begins to fall responsive to the opening of NFET SB1. At time T6, when both NFET SB1 and NFET SB2 are opened, voltage VS becomes zero. NFET SB1 and NFET SB2 are maintained in an open position for a predetermined time period to avoid a shoot-through condition. At time T7, LED controller 305 is arranged to switch the output gate voltage VG3 to a low state for application to NFET SL3 thereby opening NFET SL3 when substantially zero voltage is presented thereacross. At time T8, LED controller 305 is arranged to switch the output gate voltage VG1 to a high state for application to NFET SL1 and to switch the output gate voltage VG2 to a high state for application to NFET SL2 thereby closing NFETs SL1 and SL2 when substantially zero voltage is presented thereacross. In one embodiment, NFETs SL1 and SL2 can be closed at any time between T7 and T9.

At time T9, NFET SB2 is closed and voltage VS begins to fall. At time T10, voltage VS falls to the negative operating voltage and at time T11 LED controller 305 is arranged to switch the output gate voltage VG3 to a high state for application to NFET SL3 thereby closing NFET SL3. At time T12, LED controller 305 is arranged to switch the output gate voltage VG1 to a low state for application to NFET SL1 thereby opening NFET SL1 and preventing current from flowing through LED luminaire L1. At time T13, LED controller 305 is arranged to switch the output gate voltage VG2 to a low state for application to NFET SL2 thereby opening NFET SL2 and preventing current from flowing through LED luminaire L2. The voltage across LED luminaire L3 thus rises to the necessary operating voltage and current flows therethrough.

At time T14, NFET SB1 is opened and voltage VS begins to rise responsive thereto. At time T15, when both NFET SB1 and SB2 are opened, voltage VS becomes zero. At time T16, LED controller 305 is arranged to switch the output gate voltage VG3 to a low state for application to NFET SL3 thereby opening NFET SL3 when substantially zero voltage is presented thereacross. At time T17, LED controller 305 is arranged to switch the output gate voltage VG1 to a high state for application to NFET SL1 and to switch the output voltage VG2 to a high state for application to NFET SL2 thereby closing NFETs SL1 and SL2 when substantially zero voltage is presented thereacross. At time T18, NFET SB1 is closed and voltage VS begins to rise. At time T19 voltage VS rises to the positive operating voltage and at time T20 LED controller 305 is arranged to switch the output gate voltage VG3 to a high state for application to NFET SL3, thus closing NFET SL3.

Figure 5:
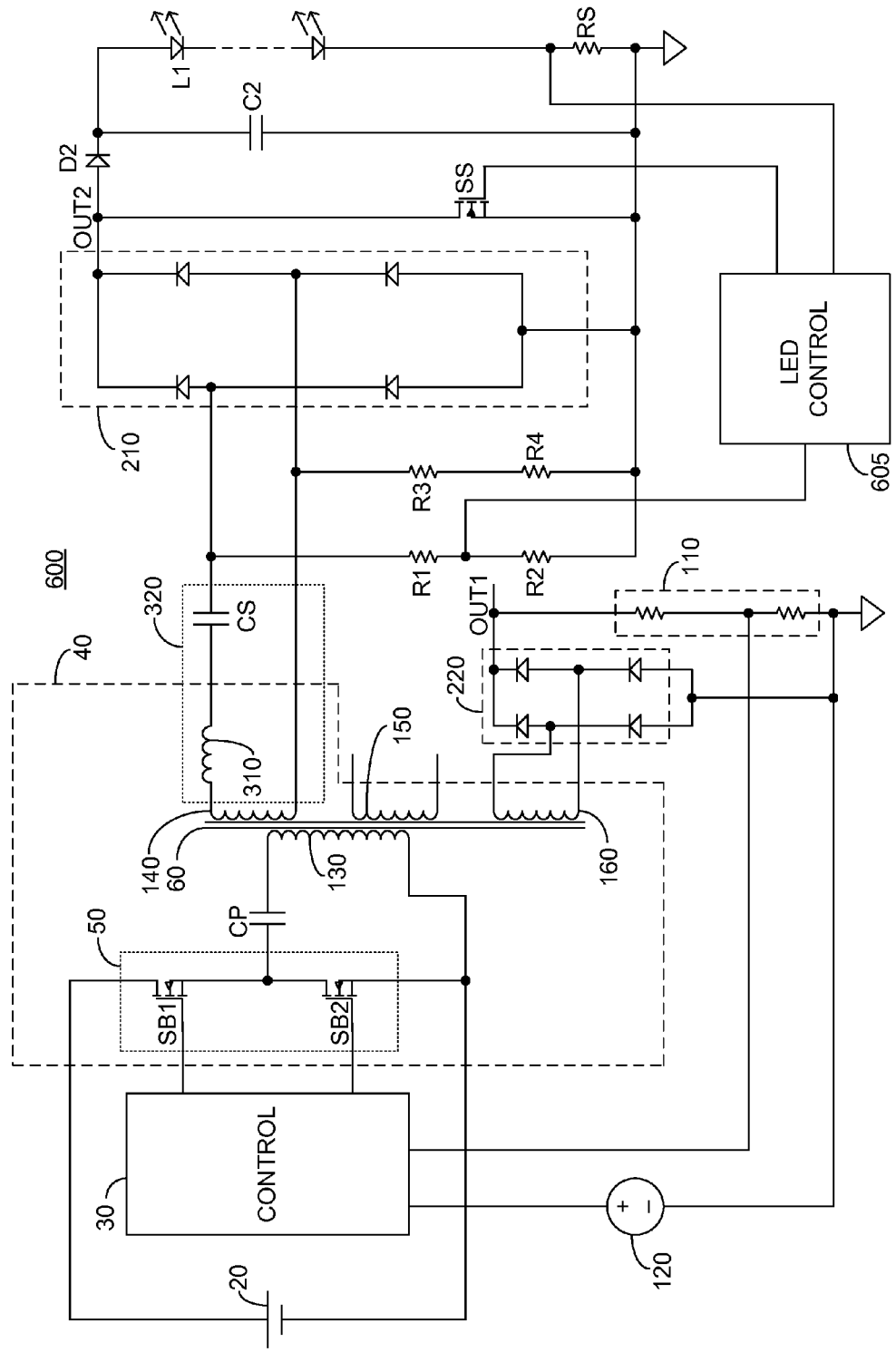
FIG. 5 illustrates a high level schematic diagram of a first embodiment of a synchronous boost mode LED luminaire driving circuit, according to certain embodiments.

FIG. 5 illustrates a high level schematic diagram of an LED luminaire driving circuit 600, according to certain embodiments. LED luminaire driving circuit 600 comprises: power source 20; resonant mode controller 30; converter 40 comprising bridge circuit 50, primary side capacitor CP and transformer 60; secondary side capacitor CS; voltage divider 110; voltage source 120; diode bridge 210; diode bridge 220; an LED controller 605; capacitor C2; LED luminaire L1; NFET SS; sense resistor RS; diode D2; and resistors R1, R2, R3 and R4. A single LED luminaire is illustrated, however this is not meant to be limiting in any way and any number of LED luminaires may be provided without exceeding the scope. Bridge circuit 50 comprises NFETs SB1 and SB2. Transformer 60 comprises: primary winding 130; and secondary windings 140, 150 and 160. Secondary winding 140 exhibits leakage inductance 310.

The output of power source 20 is coupled to the drain of NFET SB1 and the return of power source 20 is coupled to the source of NFET SB2. The gates of NFETs SB1, SB2 are each coupled to a respective output of resonant mode controller 30. The source of NFET SB1 is coupled to the drain of NFET SB2 and a first end of primary side capacitor CP. A second end of primary side capacitor CP is coupled to a first end of primary winding 130 of transformer 60 of converter 40. A second end of primary winding 130 is coupled to the return of power source 20.

A first end of secondary winding 140 is coupled to a first end of leakage inductance 310, and a second end of leakage inductance 310 is coupled to a first end of secondary side capacitor CS. The second end of secondary side capacitor CS is coupled to a first input of diode bridge 210 and a first end of resistor R1. The second end of secondary winding 140 is coupled to a second input of diode bridge 210 and a first end of resistor R3. A second end of resistor R1 is coupled to a first end of resistor R2 and a respective input of LED controller 605. A second end of resistor R2 is coupled to a common potential. A second end of resistor R3 is coupled to a first end of resistor R4 and a second end of resistor R4 is coupled to the common potential. The return of diode bridge 210 is coupled to the common potential. The output of diode bridge 210, denoted OUT2, is coupled to the drain of NFET SS and the anode of diode D2. The source of NFET SS is coupled to the common potential and the gate of NFET SS is coupled to an output of LED controller 605. The cathode of diode D2 is coupled to a first end of capacitor C2 and the anode end of LED luminaire L1. The second end of capacitor C2 is coupled to the common potential and the cathode end of LED luminaire L1 is coupled to the common potential via sense resistor RS. The cathode end of LED luminaire L1 is further coupled to a respective input of LED controller 605.

Optional secondary winding 150 is coupled to a respective load (not shown). Each end of second winding 160 is coupled to a respective input of diode bridge 220 and the return of diode bridge 220 is coupled to the common potential. The output of diode bridge 220, denoted OUT1, is coupled to a load (not shown) and a first end of voltage divider 110. A second end of voltage divider 110 is coupled to the common potential and a division junction of voltage divider 110 is coupled to a respective input of resonant mode controller 30. The output of reference voltage source 120 is coupled to a respective input of resonant mode controller 30 and the return of reference voltage source 120 is coupled to the common potential.

In operation, as described above in relation to LED luminaire driving circuit 300 of FIG. 3A, resonant mode controller 30 is arranged to alternately open and close NFETs SB1 and SB2, typically at a predetermined duty cycle near 50%, with a variable frequency, such that primary winding 130 is charged when NFET SB1 is closed and discharged when NFET SB2 is closed. The voltage appearing across the load couplet to secondary winding 160 is controlled via the feedback path of voltage divider 110, as described above. Particularly, the voltage across secondary winding 160, rectified by diode bridge 220, is supplied to the load and is additionally divided by voltage divider 110. The divided voltage is compared to the voltage output by reference voltage source 120. In the event that the divided voltage is higher than the output of reference voltage source 120, resonant mode controller 30 is arranged to increase the switching frequency of bridge circuit 50 thereby reducing the amount of voltage to the load coupled to secondary winding 160. In the event that the divided voltage is lower than the output of reference voltage source 120, resonant mode controller 30 is arranged to reduce the switching frequency of bridge circuit 50 thereby increasing the amount of voltage to the load coupled to secondary winging 160.

Secondary winding 140 is similarly impacted by the change in frequency of resonant mode controller 30. Leakage inductance 310 and secondary side capacitor CS form a resonant circuit 320. Transformer 60 and secondary side capacitor CS are provided such that the resonant frequency of resonant circuit 320 is greater than the maximum switching frequency of converter 40. As a result, when resonant mode controller 30 reduces the switching frequency of converter 40, in order to increase the voltage at secondary winding 160, the switching frequency becomes further distanced from the resonant frequency of resonant circuit 320 and as a result the impedance of resonant circuit 320 increases. Thus, the increase in electrical energy caused by the reduction in switching frequency is compensated for by the increased impedance of resonant circuit 320 and the rectified voltage at output OUT2 of diode bridge 210 doesn't appreciably increase.

Similarly, when resonant mode controller 30 increases the switching frequency of converter 40, in order to reduce the voltage at secondary winding 160, the switching frequency approaches the resonant frequency of resonant circuit 320, and as a result the impedance of resonant circuit 320 decreases. Thus, the decrease in electrical energy caused by the increase in switching frequency is compensated for by the reduced impedance of resonant circuit 320 and the rectified voltage at output OUT2 of diode bridge 210 doesn't appreciably decrease.

The current flowing through LED luminaire L1 generates a voltage across the respective sense resistor RS, which is detected by LED controller 605. LED controller 605 is arranged to adjust the pulse width modulation (PWM) duty cycle of NFET SS to control the current flowing through LED luminaire L1. Particularly, when NFET SS is closed, leakage inductance 310 is charged through NFET SS to the common potential. When NFET SS is open, leakage inductance 310 is charged through LED luminaire 310, thus increasing the voltage at output OUT2 of diode bridge 210. In one embodiment, NFET SS is driven with trailing edge modulation, responsive to voltage VS divided by resistors R1 and R2 and received by LED controller 605. When driven with trailing edge modulation, NFET SS is closed when voltage VS is zero and leakage 310 has been completely discharged through LED luminaire L1. As a result, NFET SS is closed when zero voltage is presented thereacross. As described above, resistors R3 and R4 are arranged to balance the resistance provided by resistors R1 and R2, such that the resistance at the inputs of diode bridge 210 are equal.

Figure 6A:
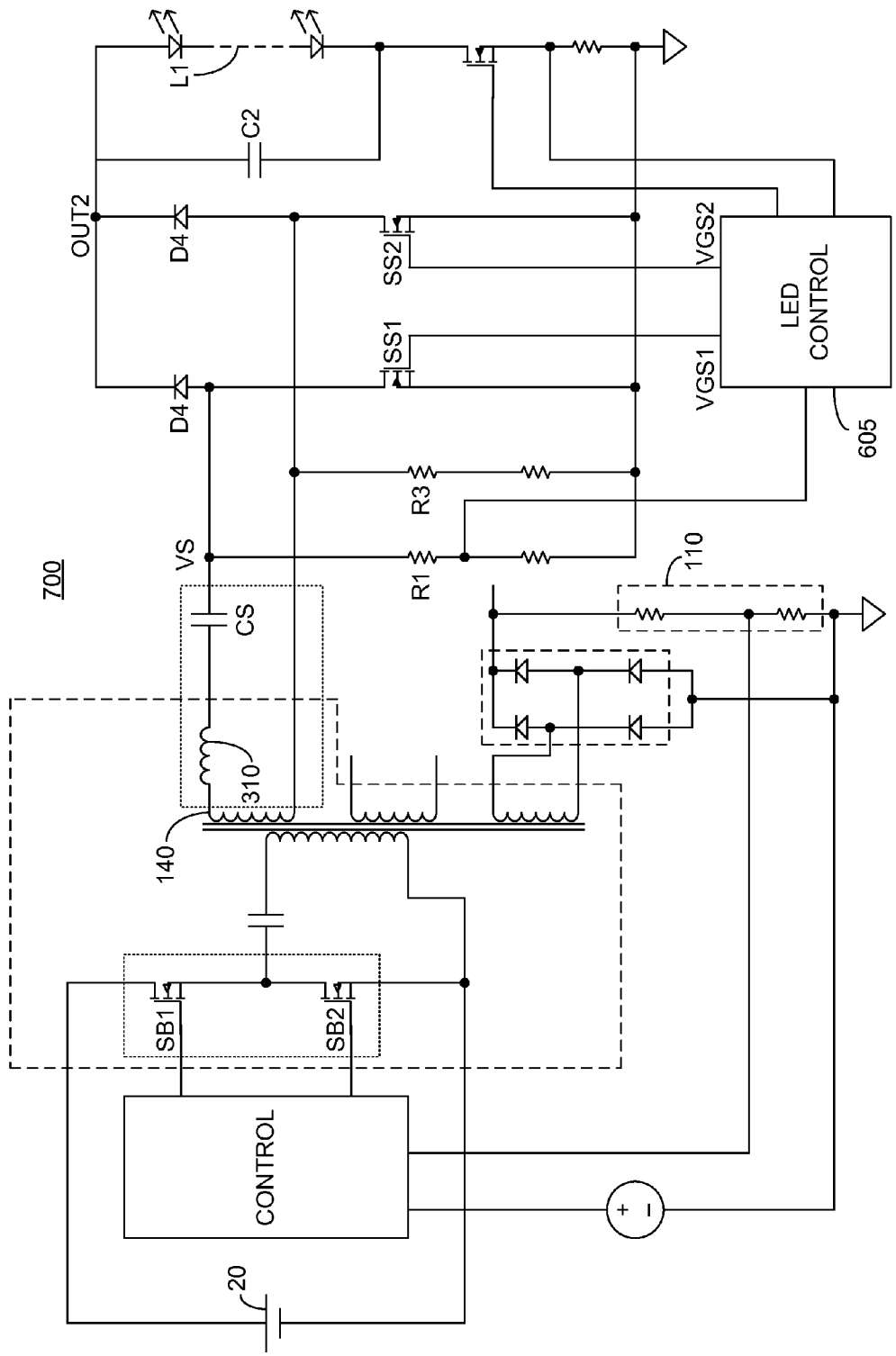
FIG. 6A illustrates a high level schematic diagram of a second embodiment of a synchronous boost mode LED luminaire driving circuit, according to certain embodiments.

FIG. 6A illustrates a high level schematic diagram of an LED luminaire driving circuit 700, according to certain embodiments. The arrangement of LED luminaire driving circuit 700 is in all respects similar to the arrangement of LED luminaire driving circuit 600 of FIG. 5 with the exception that diode bridge 210 is replaced with a pair of diodes D4, an electronically controlled switch SS1 and an electronically controlled switch SS2. Additionally, NFET SS and diode D2 are not provided. In one embodiment, electronically controlled switch SS1 and electronically controlled switch SS2 are each implemented as an NFET, and are described herein as such. The anode of a first diode D4 is coupled to the second end of capacitor CS, the first end of resistor R1 and the drain of NFET SS1. The source of NFET SS1 is coupled to the common potential and the gate of NFET SS1 is coupled to a respective output LED controller 605. The anode of the second diode D4 is coupled to the second end of secondary winding 140, the second end of leakage inductance 310, the first end of resistor R3 and the drain of NFET SS2. The source of NFET SS2 is coupled to the common potential and the gate of NFET SS2 is coupled to a respective output of LED controller 605. The cathode of each of the first and second diode D4 is coupled to the first end of capacitor C2 and the anode end of LED luminaire L1.

Figure 6B:
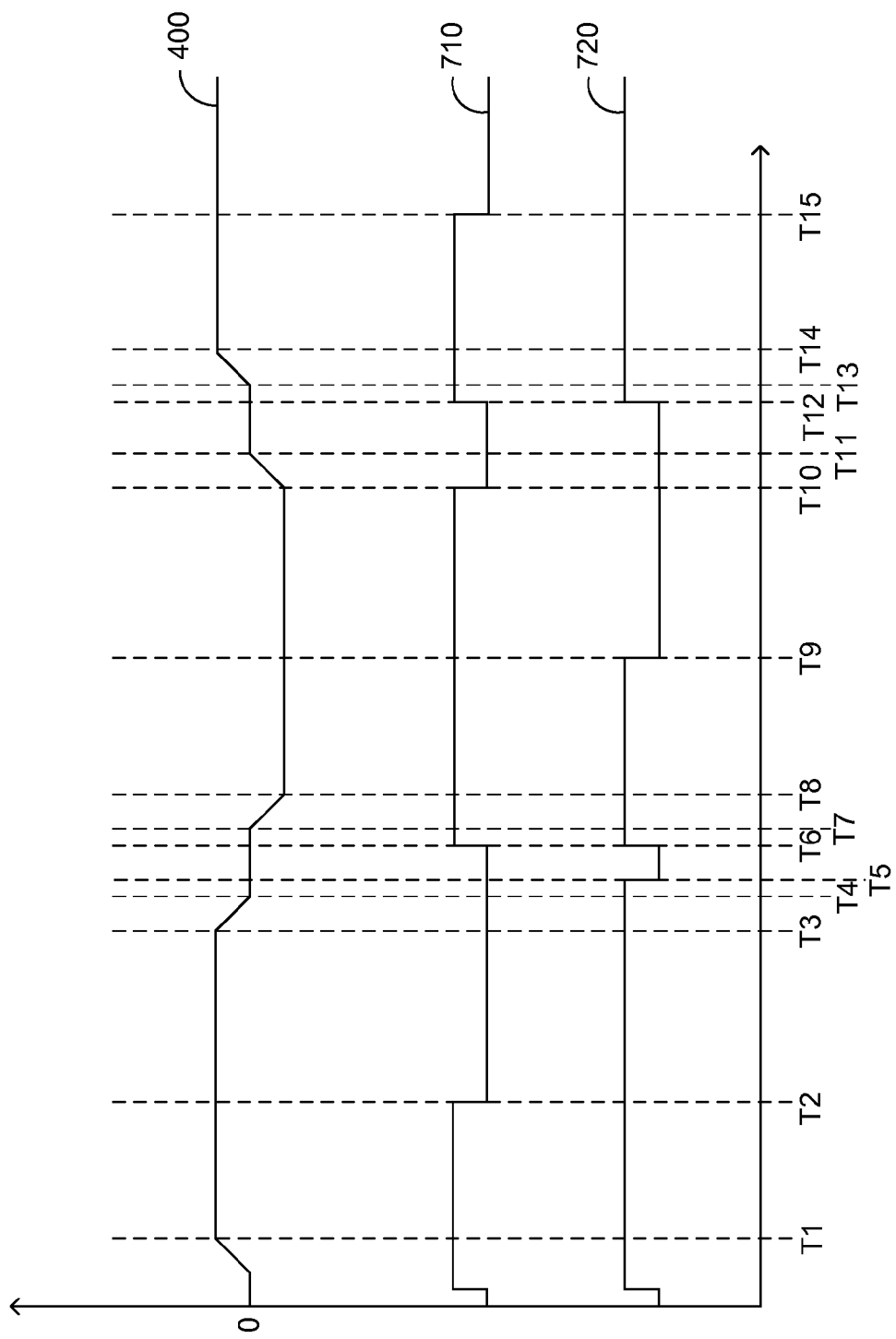
FIG. 6B illustrates waveforms of certain components of the LED luminaire driving circuit of FIG. 6A.

The operation of LED luminaire driving circuit 700 is in all respects similar to the operation of LED luminaire driving circuit 600, with the exception that the charging and discharging of leakage inductance 310 is controlled via NFETs SS1, SS2, as illustrated in FIG. 6B, where the x-axis represents time and the y-axis represents voltage in arbitrary units. The voltage across secondary winding 140 is denoted VS and illustrated by graph 400 of FIG. 6B. The gate voltage of NFET SS1 is denoted VGS1 and illustrated by graph 710 of FIG. 6B. The gate voltage of NFET SS2 is denoted VGS2 and illustrated by graph 720 of FIG. 6B.

At time T1, NFET SB1 is closed and voltage VS rises to the positive operating voltage, gate voltages VGS1 and VGS2 being high at time T1. Leakage inductance 310 is thus being charged. At time T2, LED controller 605 is arranged to output a low state gate voltage VGS1 to NFET SS1, thereby opening NFET SS1 and allowing current to flow through the first diode D4 to LED luminaire L1 with the return path supplied by NFET SS2. As a result, leakage inductance 310 begins to discharge. At time T3, NFET SB1 is opened and voltage VS begins to fall as NFET SB1 opens. At time T4, when both NFET SB1 and NFET SB2 are opened, voltage VS becomes zero. NFET SB1 and NFET SB2 are maintained in an open position for a predetermined time period to avoid a shoot-through condition where NFET SB1 and NFET SB2 are closed at the same time, thereby short circuiting power source 20. At time T5, LED controller 605 is arranged to switch gate voltage VGS2 to a low state for application to NFET SL2 thereby opening NFET SL2 when substantially zero voltage is presented thereacross. In another embodiment (not shown), NFET SL2 is left closed until time T9 described below. At time T6, when VS is still zero, LED controller 605 is arranged to respectively switch output gate voltages VGS1, VGS2 to a high state for application to NFETs SL1, SL2, thereby forming a charging path for leakage inductance 310 in a direction opposing the charge direction of time T1. At time T7, NFET SB2 is closed and voltage VS begins to fall and starts charging leakage inductance 310 in a negative direction opposing the charge direction of time T1. At time T8, voltage VS falls to the negative operating voltage and the charging of leakage inductance 310 continues. At time T9, LED controller 605 is arranged to switch the output gate voltage VGS2 to a low state for application to NFET SL2. Leakage inductance 310 is thus discharged by powering LED luminaire L1 through second diode D4. At time T10, NFET SB2 is opened and voltage VS begins to rise as NFET SB2 opens. Additionally, LED controller 605 is arranged to switch the output gate voltage VGS1 to a low state for application to NFET SL1. In another embodiment (not shown), NFET SL1 is left closed until time T15 described below. At time T11, when both NFET SB1 and SB2 are opened, voltage VS becomes zero. At time T12, LED controller 605 is arranged to respectively switch gate voltages VGS1, VGS2 to high states for application to NFETs SL1, SL2 thereby closing NFETs SL1 and SL2 when substantially zero voltage is presented thereacross. Leakage inductance 310 thus begins to charge, as described above in relation to time T1. At time T13, NFET SB1 is closed and voltage VS begins to rise. At time T14 voltage VS rises to the positive operating voltage and at time T15 LED controller 605 is arranged to switch gate voltage VGS1 to the low state for application to NFET SL1, thereby powering LED luminaire L1 with the power discharged from leakage inductance 310, as described above in relation to time T2.

Figure 7A:
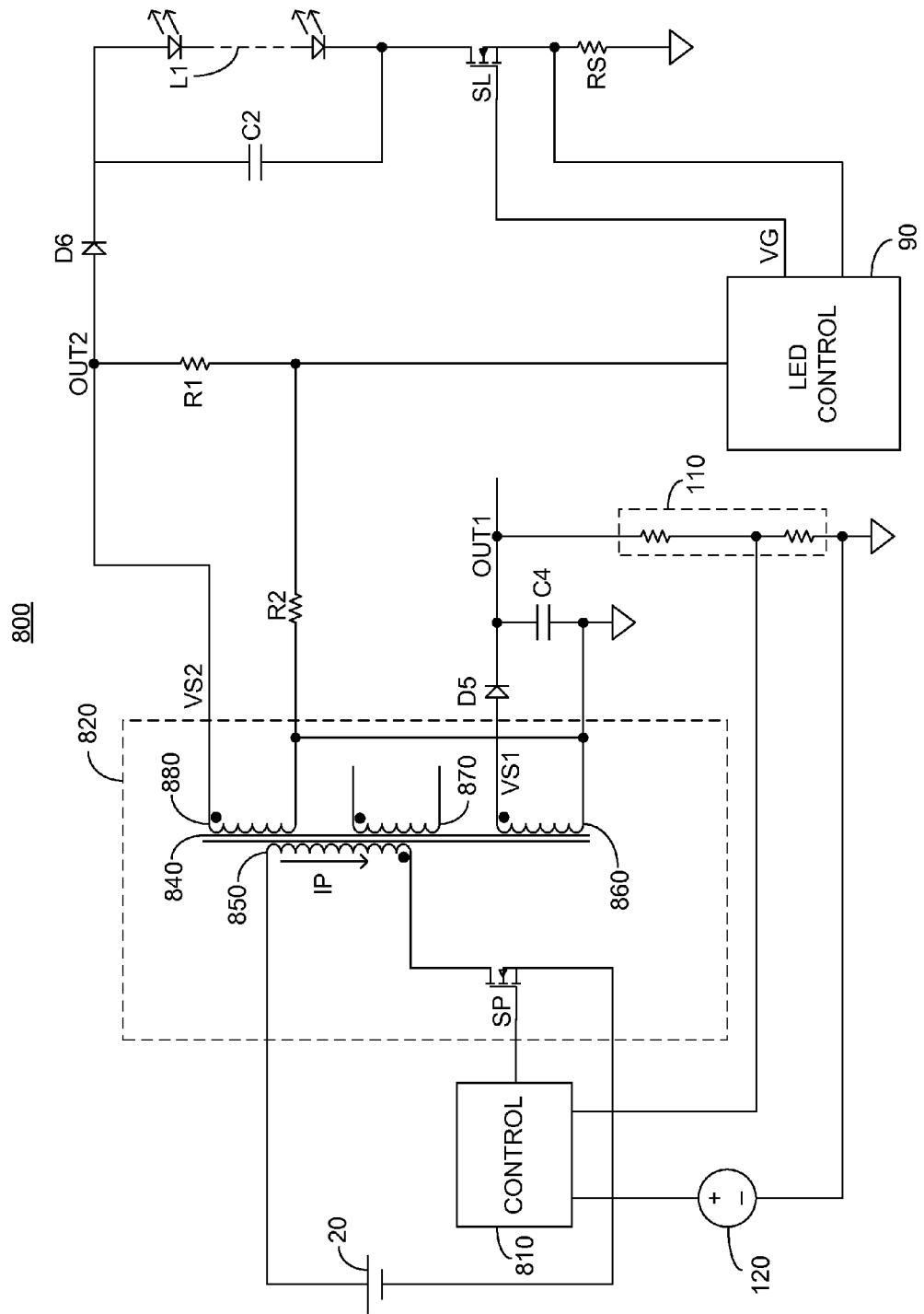
FIG. 7A illustrates a high level schematic diagram of a fly-back mode LED luminaire driving circuit, according to certain embodiments.

FIG. 7A illustrates a high level schematic diagram of an LED luminaire driving circuit 800, according to certain embodiments. LED luminaire driving circuit 800 comprises: power source 20; a primary side controller 810; a converter 820 comprising a primary electronically controlled switch SP and a transformer 840; a unidirectional electronic valve D5; a capacitance element C4; voltage divider 110; voltage source 120; resistors R1 and R2; a unidirectional electronic valve D6; an LED controller 805; capacitor C2; LED luminaire L1; NFET SL; and sense resistor RS. A single LED luminaire is illustrated, however this is not meant to be limiting in any way and any number of LED luminaires may be provided without exceeding the scope. Transformer 840 comprises: a primary winding 850; and a plurality of secondary windings, denoted respectively 860, 870 and 880. In one embodiment, primary electronically controlled switch SP is implemented as an NFET, and is described herein as such. In another embodiment, unidirectional electronic valves D5 and D6 are each implemented as a diode, and are described herein as such. In one embodiment, capacitance element C4 is implemented as a capacitor, and is described herein as such. The turns ratio of secondary winding 860 and secondary winding 880 is a function of the ratio between the operating voltage of LED luminaire L1 and the operating voltage of the load at an output OUT1 such that when LED luminaire L1 has current flowing therethrough the voltage across secondary winding 860, denoted VS1, is less than the operating voltage of the load at output OUT1, as will be described below.

The output of power source 20 is coupled to a first end of primary winding 850 of transformer 840 and the second end of primary winding 850 is coupled to the drain of NFET SP, the polarity of the second end of primary winding 850 denoted with a dot. The source of NFET SP is coupled to the return of power source 20 and the gate of NFET SP is coupled to an output of primary side controller 810. The anode of diode D5 is coupled to a first end of secondary winding 860 of transformer 840, the polarity thereof denoted with a dot. The cathode of diode D5 is coupled to a first end of capacitor C4, a first end of voltage divider 110 and a load (not shown), the node denoted OUT1. The second end of capacitor C4 is coupled to a common potential and the second end of secondary winding 860 is coupled to the common potential. A second end of voltage divider 110 is coupled to the common potential and a voltage division node of voltage divider 110 is coupled to a respective input of primary side controller 810. The output of reference voltage source 120 is coupled to a respective input of primary side controller 810 and the return of reference voltage source 120 is coupled to the common potential. Optional secondary winding 870 of transformer 840 is coupled to a respective load (not shown).

A first end of secondary winding 880 of transformer 840 is coupled to a first end of resistor R1 and the anode of diode D6, the polarity of the first end of secondary winding 880 denoted with a dot and the node is denoted OUT2, carrying a signal VS2. A second end of resistor R1 is coupled to a first end of resistor R2 and to a respective input of LED controller 805. The second end of resistor R2 and the second end of secondary winding 880 are each coupled to the common potential. The cathode of diode D6 is coupled to a first end of capacitor C2 and the anode end of LED luminaire L1. The second end of capacitor C2 is coupled to the cathode end of LED luminaire L1 and the drain of NFET SL. The source of NFET SL is coupled to a first end of sense resistor RS and a respective input of LED controller 805. The second end of sense resistor RS is coupled to the common potential and the gate of NFET SL is coupled to an output of LED controller 805.

Figure 7B:
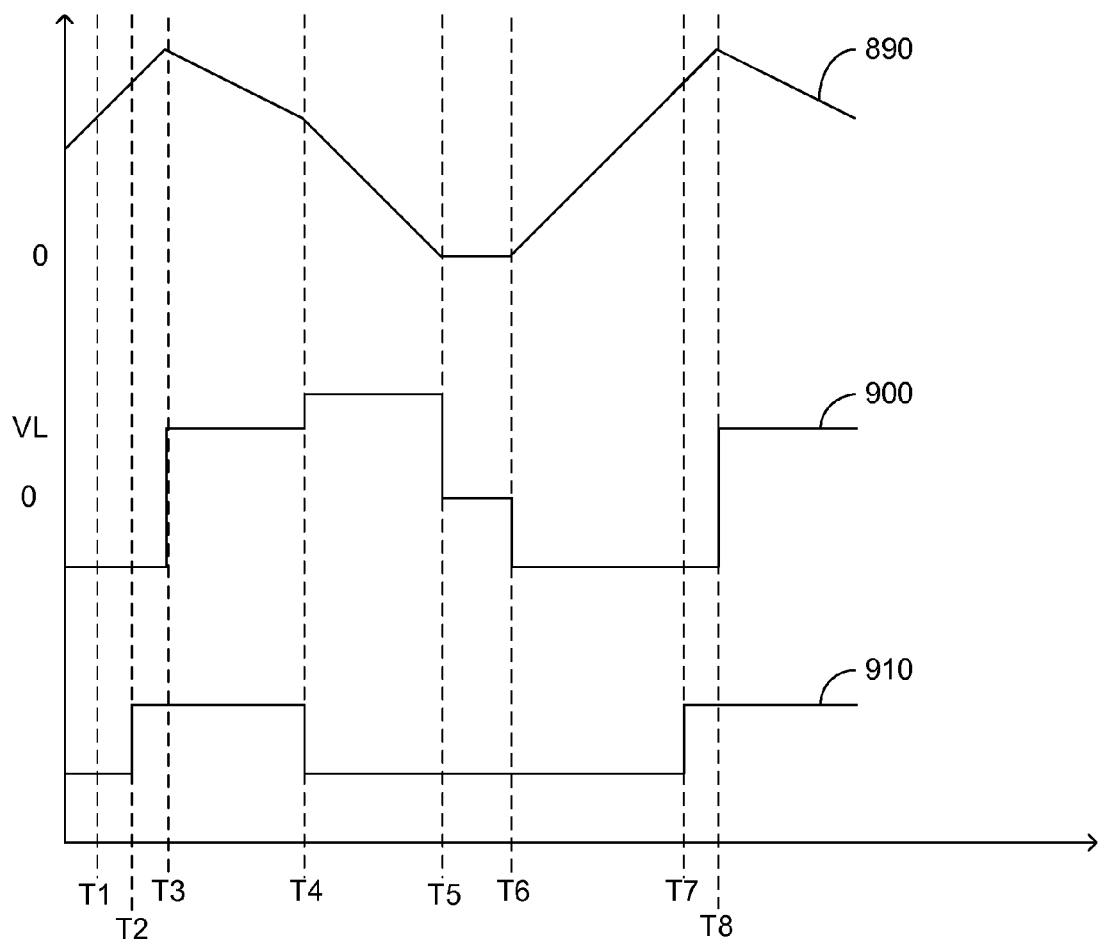
FIG. 7B illustrates waveforms of certain components of the LED luminaire driving circuit of FIG. 7A.

The operation of LED luminaire driving circuit 800 is illustrated in FIG. 7B, where the x-axis represents time and the y-axis represents voltage in arbitrary units. The current flowing through primary winding 850 of transformer 840 is denoted IP and illustrated by graph 890 of FIG. 7B. The voltage at node OUT2, denoted VS2, is illustrated by graph 900 of FIG. 7B. The gate voltage of NFET SL, output by LED controller 805, is denoted VG and illustrated by graph 910 of FIG. 7B.

At time T1, NFET SP is closed and current IP is increasing. Due to the polarity of primary winding 850 and secondary windings 860 and 880, voltage VS2 is equal to a negative voltage, and therefore no current flows through diode D6. Additionally, gate voltage VG is low and NFET SL is open. At time T2, LED controller 805 is arranged to output a high gate voltage VG to NFET SL, thereby closing NFET SL, however no current flows there through due to the blocking action of diode D6. LED controller 805 is arranged to detect voltage VS2, divided by resistors R1 and R2, so as to close NFET SL when voltage VS2 is not greater than zero. At time T3, primary side controller is arranged to open NFET SP. As a result, current IP begins to decrease and the voltage across primary winding 850 reverses, thereby causing a reversal of voltage VS2, which now forward biases diode D6, and voltage VS2 rises to the operating voltage of LED luminaire L1, denoted VL in FIG. 7B. As described above, the turns ratio of secondary windings 860 and 880 is such that when voltage VS2 equals VL, the voltage across secondary winding 860, denoted VS1, is less than the operating voltage of the load of output OUT1, and therefore diode D5 is reverse biased. For example, if the voltage at output OUT1 and stored across capacitor C4 is 12V and the operating voltage of LED luminaire L1 is less than 12V, secondary winding 880 may exhibit the same number of turns as secondary winding 860. If the operating voltage of LED luminaire L1 is 12V, secondary winding 880 may exhibit a greater number of turns than secondary winding 860. As a result, as described above, the potential at the anode of diode D5 is less than the potential at the cathode thereof when diode D6 is conducting, thereby no power is provided to capacitor C4 and output OUT1. The operation of LED luminaire L1 prevents voltage VS2 from rising above LED luminaire operating voltage VL, thereby preventing voltage VS1 from rising further.

LED controller 805 is arranged to compare the current flowing through LED luminaire L1, responsive to the voltage across sense resistor RS, with a predetermined current level. When the current exceeds the predetermined current level, at time T4 LED controller 805 is arranged to switch gate voltage VG to a low state for presentation to NFET SL, thereby opening NFET SL. Voltage VS1 across secondary winding 860 is no longer restricted by operating voltage VL of LED luminaire L1 and can continue rising to the operating voltage of the load at output OUT1. Voltage VS2 across secondary winding 880 also rises, as illustrated, however NFET SL is open and the increased voltage does not impact LED luminaire L1. Current IP continues to decrease at a rate responsive to the power supplied to OUT1. At time T5, current IP reaches zero and primary winding 850 is completely discharged, thereby presenting a respective zero voltage VS1 and VS2 across secondary windings 860 and 880. At time T6, primary side controller 810 is arranged to close NFET SP, with substantially zero voltage presented thereacross, thereby causing current IP to rise and voltage VS2 to fall to a negative voltage, as described above. At time T7, LED controller 805 is arranged to switch gate voltage VG to a high state for presentation to NFET SL, as described above in relation to time T2. Since diode D6 is reversely biased by a negative voltage when primary side NFET SP is closed, the closing (turn on) time of NFET SL can be arranged at any point between T1 and T2, or T6 and T7, without affecting the circuit operation. At time T8, primary side controller 810 is arranged to open NFET SP, as described above in relation to time T3. Advantageously, LED luminaire driving circuit 800 allows regulation of the voltage at output OUT1 without affecting the operation of LED luminaire L1. Additionally, NFET SL is closed when zero voltage is presented thereacross.

Figure 8A:
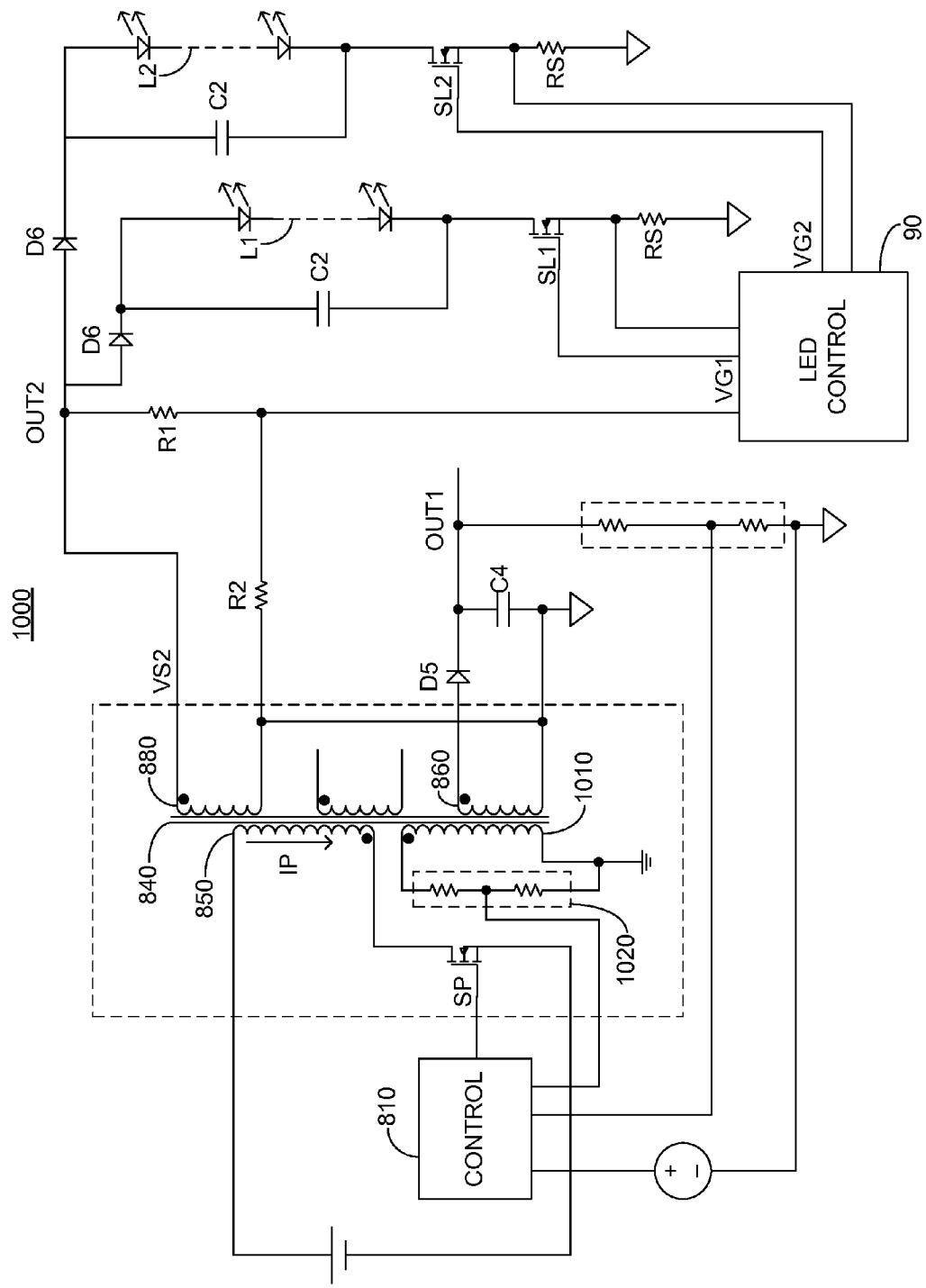
FIG. 8A illustrates a high level schematic diagram of a fly-back mode LED luminaire driving circuit, comprising a plurality of LED luminaires, according to certain embodiments.

FIG. 8A illustrates a high level schematic diagram of an LED luminaire driving circuit 1000, according to certain embodiments. LED luminaire driving circuit 1000 is in all respects similar to LED luminaire driving circuit 800 of FIG. 7A, with the exception that a plurality of LED luminaires L1, L2 are provided. Each of the plurality of LED luminaires L1, L2 has associated therewith a diode D6, a capacitor C2, a sense resistor RS and a respective one of a pair of NFETs SL1 and SL2. Additionally, transformer 840 further comprises a second primary winding 1010, and converter 820 further comprises a voltage divider 1020 associated with second primary winding 1010.

The anode end of each of LED luminaires L1, L2 is coupled to a first end of the respective capacitor C2 and the cathode of the respective diode D6, the anode of each diode D6 coupled to node OUT2. The cathode end of each of LED luminaires L1, L2 is coupled to a second end of the respective capacitor C2 and the drain of the respective one of NFETs SL1, SL2. The source of each of NFETs SL1, SL2 is coupled to the common potential via the respective sense resistor RS and to a respective input of LED controller 805. The gate of each of NFETs SL1, SL2 is coupled to a respective output of LED controller 805. A first end of primary winding 1010 of transformer 840 is coupled to a first end of voltage divider 1020, the polarity of the first end of primary winding 1010 denoted with a dot. A voltage division node of voltage divider 1020 is coupled to a respective input of primary side controller 810. A second end of voltage divider 1020 and the second end of primary winding 1010 are each coupled to a primary side common potential.

Figure 8B:
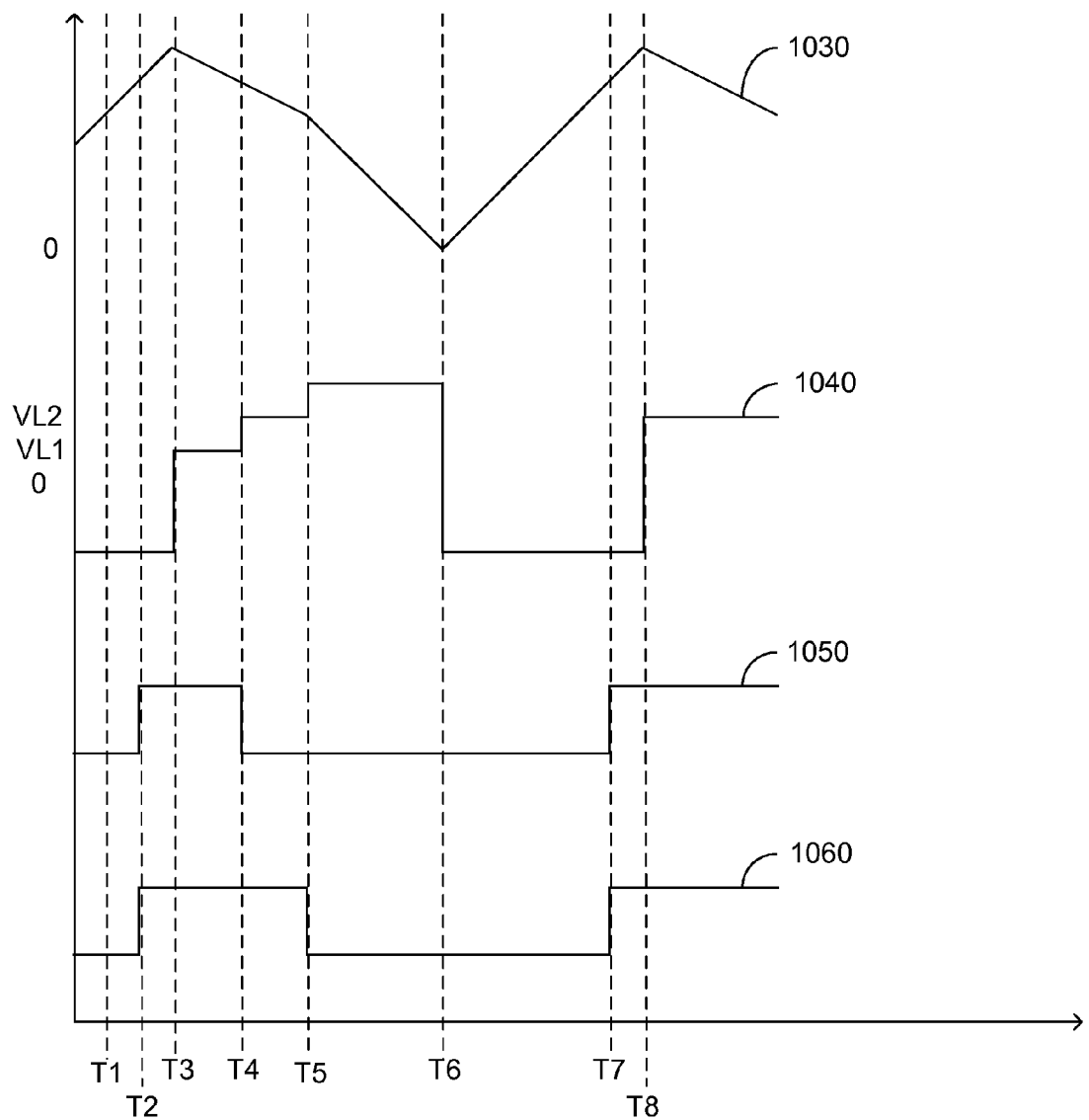
FIG. 8B illustrates waveforms of certain components of the LED luminaire driving circuit of FIG. 8A.

The operation of LED luminaire driving circuit 1000 is illustrated in FIG. 8B, where the x-axis represents time and the y-axis represents voltage in arbitrary units. The current flowing through primary winding 850 of transformer 840 is denoted IP and illustrated by graph 1030 of FIG. 8B. The voltage at node OUT2 is denoted VS2 and illustrated by graph 1040 of FIG. 8B. The gate voltage of NFET SL1, output by LED controller 805, is denoted VG1 and illustrated by graph 1050 of FIG. 8B. The gate voltage of NFET SL2, output by LED controller 805, is denoted VG2 and illustrated by graph 1060 of FIG. 8B.

At time T1, NFET SP is closed and current IP is increasing. Due to the polarity of primary winding 850 and secondary windings 860 and 880, and the respective diodes D5 and D6, voltage VS2 is equal to a negative voltage and no current flows through the output secondary windings 860, 880. Additionally, gate voltages VG1 and VG2 are low and thus NFETs SL1 and SL2 are open. At time T2, LED controller 805 is arranged to respectively switch gate voltages VG1 and VG2 to a high state for presentation to NFETs SL1 and SL2, thereby closing NFETs SL1 and SL2. LED controller 805 is arranged to detect voltage VS2, divided by resistors R1 and R2, so as to close NFETs SL1, SL2 when voltage VS2 is not greater than zero. At time T3, primary side controller 810 is arranged to open NFET SP. As a result, current IP begins to decrease and the voltage across primary winding 850 reverses, thereby causing a reversal of voltage VS2 to the operating voltage of LED luminaire L1, denoted VL1 in FIG. 8B. As described above, the turns ratio of secondary windings 860 and 880 is such that when voltage VS2 equals VL1, the voltage across secondary winding 860 is less than the operating voltage of the load of output OUT1. As a result, the potential at the anode of diode D5 is less than the potential at the cathode thereof, thereby not providing power to capacitor C4 and output OUT1. The operation of LED luminaire L1 prevents voltage VS2 from rising above LED luminaire operating voltage VL1, thereby preventing voltage VS1 from rising.

LED controller is arranged to compare the current flowing through LED luminaire L1, responsive to the voltage across the respective sense resistor RS, with a predetermined current level. When the current exceeds the predetermined current level, at time T4 LED controller 805 is arranged to switch gate voltage VG1 to a low state for presentation to NFET SL1, thereby opening NFET SL1. Voltage VS2 then continues to rise until reaching the operating voltage of LED luminaire L2, denoted VL2 in FIG. 8B, and current flows through LED luminaire L2. LED controller 805 is arranged to compare the current flowing through LED luminaire L2, responsive to the voltage across the respective sense resistor RS, with a predetermined current level. When the current exceeds the predetermined current level at time T5. LED controller 805 is arranged to output a low state gate voltage VG2 to NFET SL2, thereby opening NFET SL2. The voltage across secondary winding 860 is no longer restricted by operating voltage VL1 of LED luminaire L1, or operating voltage VL2 of LED luminaire L2 and thus rises to the operating voltage of the load at output OUT1 until diode D5 is forward biased. Responsive to the increase in voltage across secondary winding 860, voltage VS2 across secondary winding 880 also rises, as illustrated. However, NFETs SL1 and SL2 are open and the increased voltage does not impact LED luminaires L1, L2. Current IP continues to decrease as power is fed to the load coupled to OUT1.

At time T6, current IP reaches zero and primary winding 850 is completely discharged. The drain voltage of NFET SP begins to oscillate along the down slope and primary side controller 810 is arranged to detect the drain voltage of NFET SP, reflected to primary winding 1010 and divided by voltage divider 1020, as known to those skilled in the art of quasi-resonant switching. When the drain voltage of NFET SP reaches a low valley peak, primary side controller 810 is arranged to close NFET SP, with minimal voltage thereacross, thereby causing current IP to rise and voltage VS2 to fall to a negative voltage, as described above. At time T7, LED controller 805 is arranged to switch gate voltages VG1 and VG2 to a high state for presentation to NFET SL1 and NFET SL2, as described above in relation to time T2. Since diode D6 is reversely biased by a negative voltage when primary side NFET SP is closed, the closing (turn on) time of NFETs SL1 and SL2 can be arranged at any point between T1 and T2, or T6 and T7, without affecting the circuit operation. At time T8, primary side controller 810 is arranged to open NFET SP, as described above in relation to time T3. Advantageously, LED luminaire driving circuit 1000 allows regulation of the voltage at output OUT1 without affecting the operation of LED luminaires L1, L2. Additionally, NFETs SL1 and SL2 are each closed when substantially zero voltage is presented thereacross.

Figure 9A:
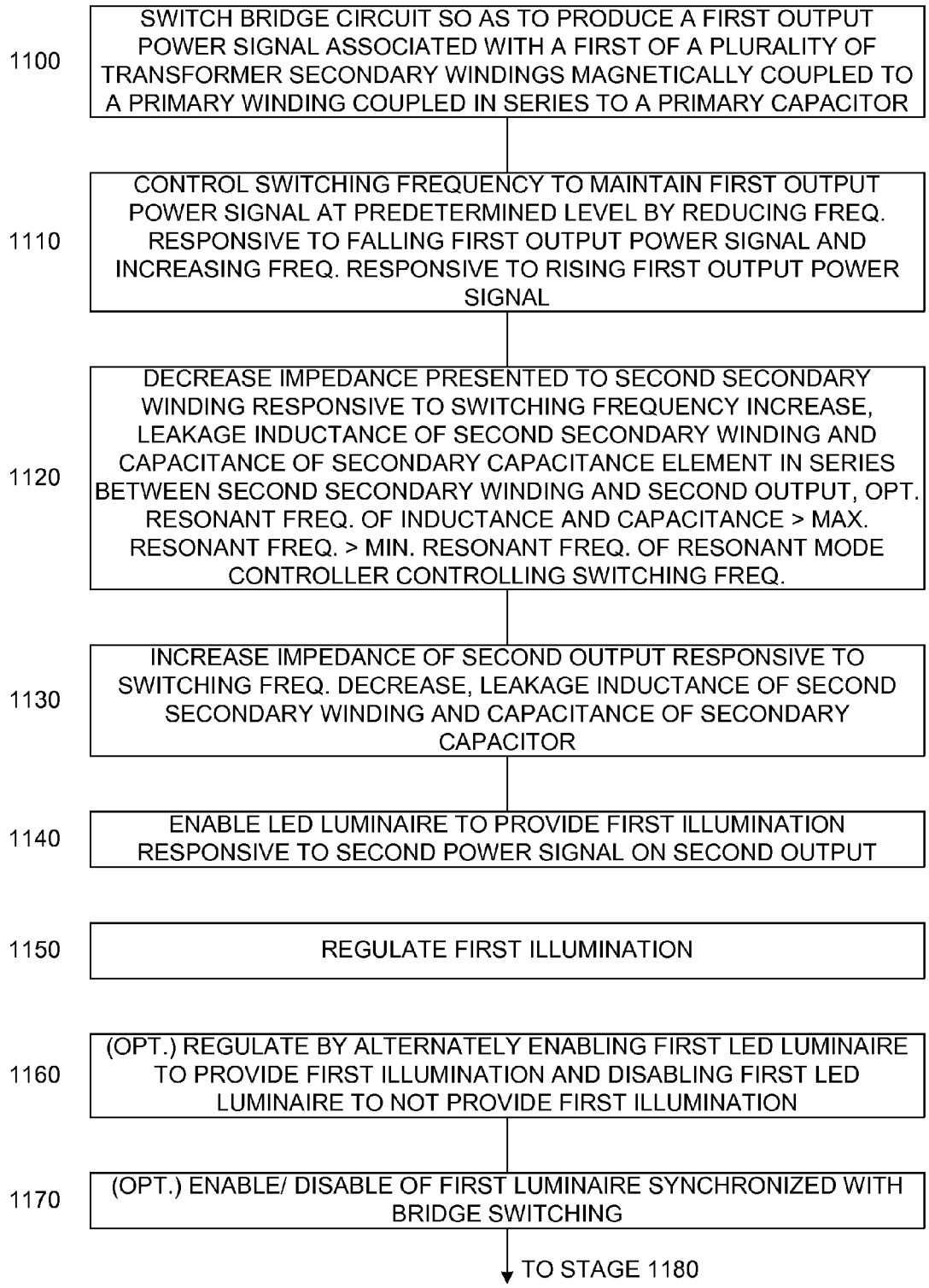
FIGS. 9A-9B illustrate a high level flow chart of a first embodiment of an LED luminaire driving method, according to certain embodiments.
Figure 9B:
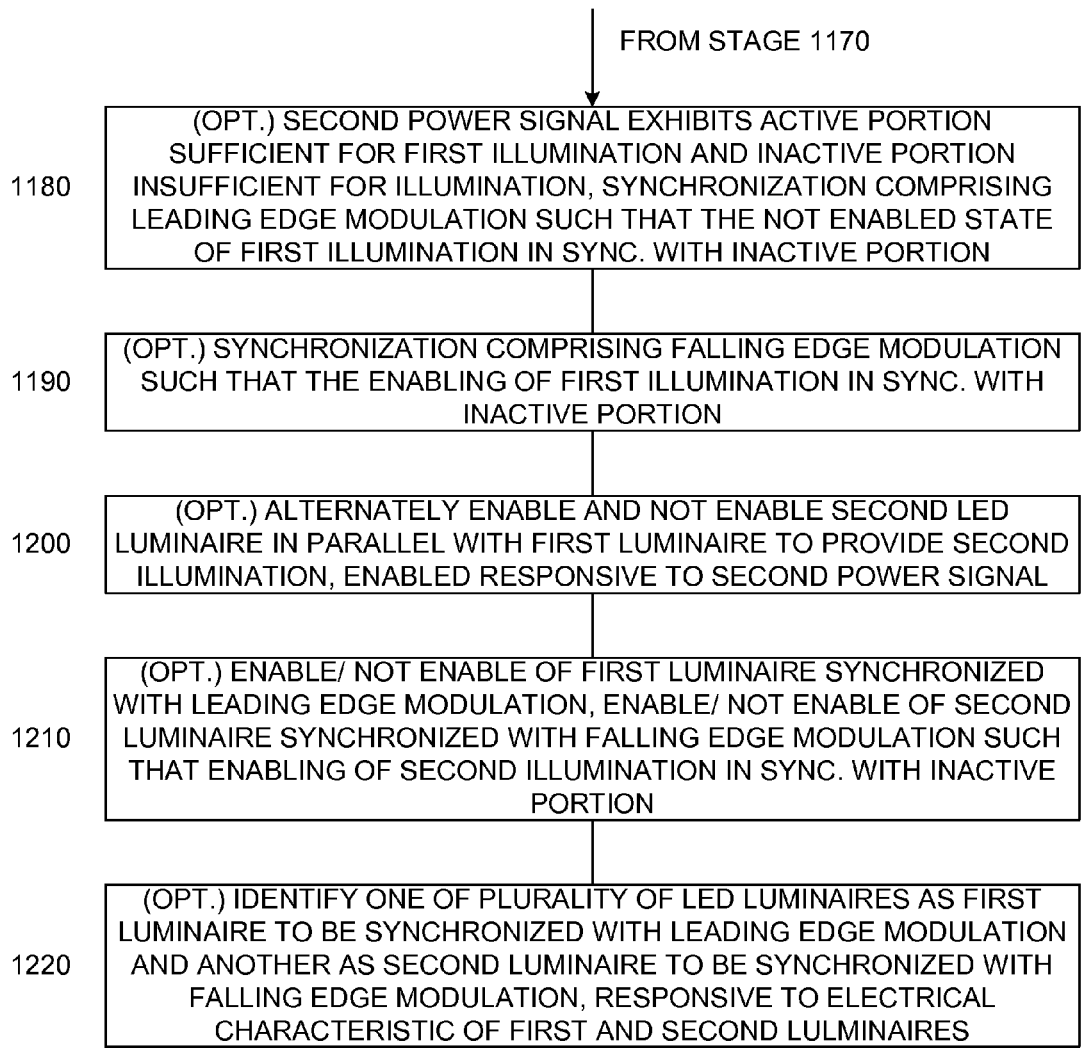

FIGS. 9A-9B illustrate a high level flow chart of a first LED luminaire driving method, according to certain embodiments. In stage 1100, a bridge circuit is switched so as to produce a first output power signal, associated with a first of a plurality of secondary windings of a transformer. Each of the plurality of secondary windings of the transformer is magnetically coupled to the primary winding of the transformer. The primary winding of the transformer is coupled in series to a primary side capacitor.

In stage 1110, the frequency of the bridge circuit switching of stage 1100 is controlled so as to maintain the first output power signal at a predetermined level, by reducing the switching frequency responsive to a falling first output power signal and increasing the switching frequency responsive to a rising first output power signal.

In stage 1120, responsive to the switching frequency increase of stage 1110, the impedance presented to a second of the plurality of secondary windings of stage 1100 is decreased. Particularly, a secondary side resonant circuit is coupled in series between the second secondary winding and a second output. The secondary side resonant circuit comprises the leakage inductance of the second secondary winding and a secondary side capacitance element. The impedance decrease is responsive to the leakage inductance and the capacitance of the secondary side capacitance of the resonant circuit. Optionally, the resonant frequency of the secondary side resonant circuit is greater than a maximum switching frequency of the bridge circuit of stage 1100. Particularly, the switching frequency of the bridge circuit is controlled by a resonant mode controller exhibiting a minimum resonant frequency and a maximum resonant frequency greater than the minimum resonant frequency. The resonant frequency of the secondary side resonant circuit is arranged to be greater than the maximum resonant frequency of the resonant mode controller. In stage 1130, responsive to the switching frequency decrease of stage 1110, the impedance of the second output is increased. Particularly, the impedance increase is responsive to the leakage inductance and the capacitance of the secondary side capacitance element of the resonant circuit of stage 1120.

In stage 1140, a first LED luminaire is enabled to provide a first illumination responsive to a second power signal on the second output of stage 1120. Particularly, the first LED luminaire is enabled by providing a current path therethrough. In stage 1150, the provided first illumination of stage 1140 is regulated. In one embodiment, the provided first illumination is regulated by pulse width modulation driving of an electronically controlled switch, as described below. In another embodiment, the provided first illumination of stage 1140 is regulated by adjusting the resistance of the current path of the first LED luminaire, such as by increasing the resistance of a transistor coupled in series with the first LED luminaire.

In optional stage 1160, the first LED luminaire of stage 1140 is alternately enabled to provide a first illumination and disabled so as not provide the first illumination. The regulation of stage 1150 comprises the alternate enabling and disabling of the first LED luminaire. In optional stage 1700, the alternate enabling and disabling of the first LED luminaire of optional stage 1160 is synchronized with the bridge circuit switching of stage 1100. Optionally, the alternate enabling and disabling of the first LED luminaire is responsive to an alternate opening and closing of a first electronically controlled switch, one of the opening and closing of the first electronically controlled switch being when the voltage across the primary winding of the transformer of stage 1100 is substantially zero. In one embodiment, the electronically controlled switch is in series with the first LED luminaire, the LED luminaire enabled responsive to a closed state of the electronically controlled switch and disabled responsive to an open state of the electronically controlled switch. In another embodiment, the electronically controlled switch is in parallel with the first LED luminaire, the LED luminaire enabled responsive to an open state of the electronically controlled switch and disabled responsive to a closed state of the electronically controlled switch.

In optional stage 1180, the second power signal of stage 1140 exhibits an active portion which provides sufficient voltage to provide the first illumination and an inactive portion which does not provide sufficient voltage to provide the first illumination. Optionally, the inactive portion is a zero voltage portion. The synchronization of optional stage 1170 comprises leading edge modulation such that the non-enabled state of the first illumination of the first LED luminaire is in synchronization with the second output power signal inactive portion. In the embodiment where the non-enabled state of the first illumination is responsive to the first electronically controlled switch of optional stage 1170, the first electronically controlled switch is switched during the second power output power signal inactive portion. Advantageously, as described above, the inactive portion is optionally a zero voltage portion and the first electronically controlled switch is switched when substantially zero voltage is presented thereacross thereby reducing switching losses.

In optional stage 1190, the synchronization of optional stage 1170 comprises falling edge modulation such that the enabling of the first illumination of the first LED luminaire is in synchronization with the second output power signal inactive portion of optional stage 1180. Particularly, the enabling of the first illumination of the first LED luminaire is during the second output power signal inactive portion and synchronized with the beginning of the second output power signal active portion. In the embodiment where the enabling of the first illumination is responsive to the first electronically controlled switch of optional stage 1170, the first electronically controlled switch is switched during the second power output power signal inactive portion. Advantageously, as described above, the inactive portion is optionally a zero voltage portion and the first electronically controlled switch is switched when substantially zero voltage is presented thereacross.

In optional stage 1200, a second LED luminaire coupled in parallel to the first LED luminaire of stage 1140 and is alternately enabled to provide a second illumination and disabled so as not to provide the second illumination. The second illumination is enabled responsive to the second power signal of stage 1120. In optional stage 1210, the synchronization of optional stage 1170 comprises leading edge modulation such that the disabling of the first illumination of the first LED luminaire is in synchronization with the second output power signal inactive portion of optional stage 1180, as described above in relation to optional stage 1190. Additionally, the alternate enabling and disabling of the second LED luminaire of optional stage 1200 comprises falling edge modulation synchronized with the switching of the bridge circuit of stage 1100 such that enabling of the second illumination is in synchronization with the second output power signal inactive portion. Particularly, the enabling of the second illumination is during the second output power signal inactive portion and synchronized with the beginning of the second output power signal active portion. Optionally, the enabling of the second LED luminaire is responsive to a second electronically controlled switch, the electronically controlled switch being switched during the second power signal inactive portion.

In optional stage 1220, one of a plurality of LED luminaires is identified as the first LED luminaire of optional stage 1160 to be controlled with leading edge modulation, as described in optional stage 1210, and another of the plurality of LED luminaires is identified as the second LED luminaire of optional stage 1200 to be controlled with falling edge modulation, as described in optional stage 1210. The identification is responsive to an electrical characteristic of each of the first and second LED luminaires. Optionally, the electrical characteristic is the operating voltage of each of the first and second LED luminaires.

Figure 10A:
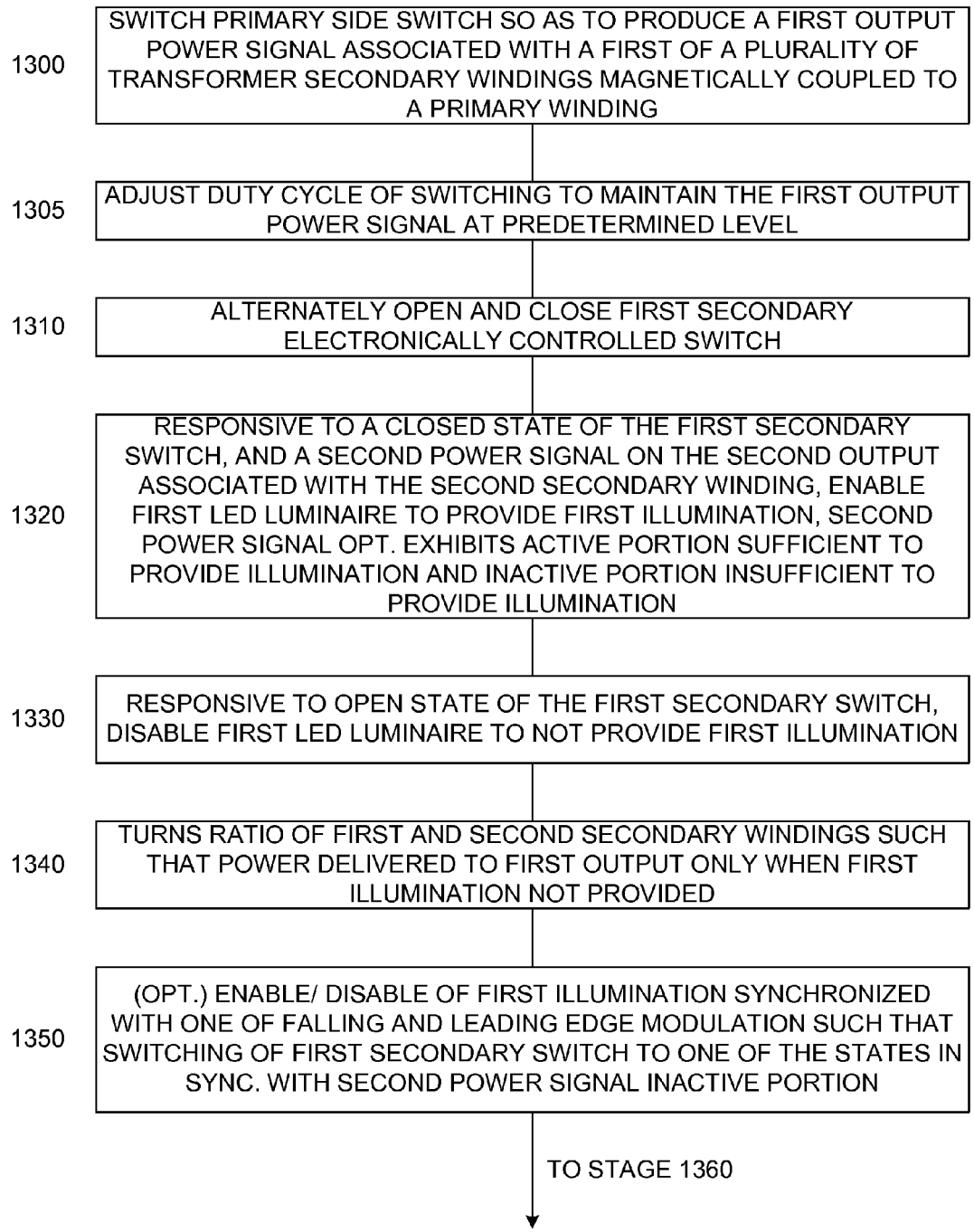
FIGS. 10A-10B illustrate a high level flow chart of a second embodiment of an LED luminaire driving method, according to certain embodiments.
Figure 10B:
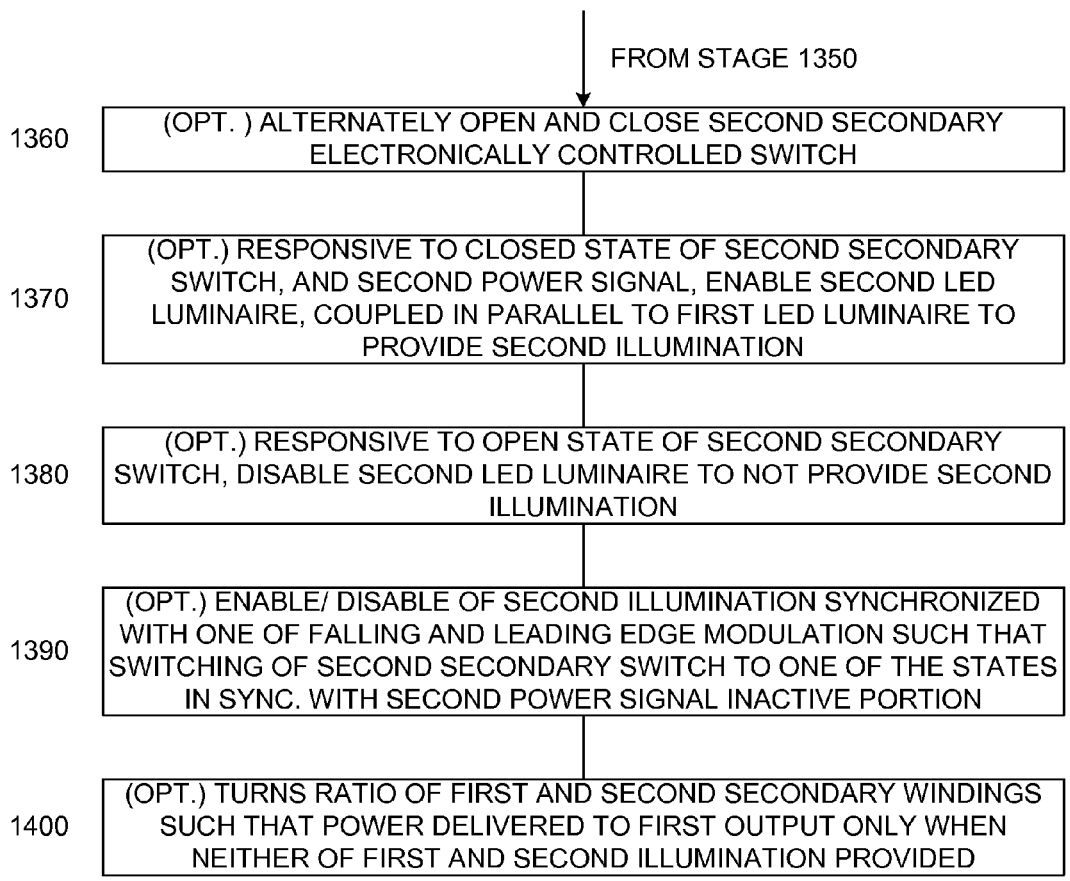

FIGS. 10A-10B illustrate a high level flow chart of a second LED luminaire driving method, according to certain embodiments. In stage 1300, a primary side electronically controlled switch is switched so as to produce a first output power signal associated with a first of a plurality of secondary windings of a transformer, each of the plurality of secondary windings of the transformer magnetically coupled to a primary winding of the transformer. The first power signal is produced at a first output. In stage 1305, the duty cycle of the primary side electronically controlled switch is arranged to maintain the first output power signal at a predetermined level. Particularly, the duty cycle of the primary side electronically controlled switch is increased responsive to a fall in the first output power signal and the duty cycle is decreased responsive to a rise in the first output power signal.

In stage 1310, a first secondary electronically controlled switch is alternately opened and closed. In stage 1320, responsive to a closed state of the first secondary electronically controlled switch of stage 1310, and further responsive to a second power signal on a second output associated with a second of the plurality of secondary windings of stage 1300, a first LED luminaire is enabled to provide a first illumination. Optionally, the second output power signal exhibits an active portion which provides sufficient voltage to provide the first illumination and an inactive portion which does not provide sufficient voltage to provide the first illumination. Further optionally, the inactive portion is a zero voltage portion.

In stage 1330, responsive to an open state of the first secondary electronically controlled switch of stage 1310, the first LED luminaire is disabled so as not to provide the first illumination of stage 1320.

In stage 1340, the turns ratio of the first secondary winding of stage 1300 and the second secondary winding of stage 1320 is such that power is delivered to the first output of stage 1300 only when the first illumination of stage 1320 is not enabled. As described above, optionally a unidirectional electronic valve is arranged between the first secondary winding and the first output. As a result, when the first illumination is enabled, the voltage at the first secondary winding is less than the voltage at the first output and the unidirectional electronic valve does not conduct.

In optional stage 1350, the alternate enabling and disabling of the first illumination of stages 1320-1330 is synchronized with one of falling edge modulation and leading edge modulation such that the switching of the first secondary electronically controlled switch to one of the open and closed states is in synchronization with the optional second output power signal inactive portion of stage 1320, i.e. the first secondary electronically controlled switch is switched during the second output power signal inactive portion. Advantageously, as described above, the inactive portion is optionally a zero voltage portion and the first secondary electronically controlled switch is switched when substantially zero voltage is presented thereacross, thereby reducing switching losses.

In optional stage 1360, a second secondary electronically controlled switch is alternately opened and closed. In optional stage 1370, responsive to a closed state of the second secondary electronically controlled switch of optional stage 1360, and further responsive to the second power signal of stage 1320, a second LED luminaire is enabled to provide a second illumination. The second LED luminaire is coupled in parallel to the first LED luminaire of stage 1320. In optional stage 1380, responsive to an open state of the second secondary electronically controlled switch of optional stage 1360, the second LED luminaire is disabled so as not to provide the second illumination of optional stage 1370.

In optional stage 1390, the alternate enabling and disabling of the second illumination of optional stages 1370-1380 is synchronized with one of falling edge modulation and leading edge modulation such that the switching of the second secondary electronically controlled switch to one of the open and closed states is in synchronization with the optional second output power signal inactive portion of stage 1320, i.e. the second secondary electronically controlled switch is switched during the second output power signal inactive portion. Advantageously, as described above the inactive portion is optionally a zero voltage portion and the second secondary electronically controlled switch is switched when substantially zero voltage is presented thereacross, thereby reducing switching losses.

In optional stage 1400, the turns ratio of the first secondary winding of stage 1300 and the second secondary winding of stage 1320 is such that power is delivered to the first output of stage 1300 only when neither of the first illumination of stage 1320 and the second illumination of optional stage 1370 are enabled. As described above, optionally a unidirectional electronic valve is arranged between the first secondary winding and the first output. As a result, when either of the first illumination and the second illumination are enabled, the voltage at the first secondary winding is less than the voltage the first output and the unidirectional electronic valve does not conduct.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

All publications, patent applications, patents, and other references mentioned herein are incorporated by reference in their entirety. In case of conflict, the patent specification, including definitions, will prevail. In addition, the materials, methods, and examples are illustrative only and not intended to be limiting.

It will be appreciated by persons skilled in the art that the present invention is not limited to what has been particularly shown and described herein above. Rather the scope of the present invention is defined by the appended claims and includes both combinations and sub-combinations of the various features described hereinabove as well as variations and modifications thereof which would occur to persons skilled in the art upon reading the foregoing description and which are not in the prior art.

The invention claimed is:

1. A circuit for driving at least one light emitting diode (LED) luminaire, said circuit comprising:

a resonant mode controller;
a converter comprising a transformer having a primary winding and a plurality of secondary windings each magnetically coupled to said primary winding, a bridge circuit arranged to switch responsive to said resonant mode controller, and a primary side capacitance element in electrical communication with said primary winding;
a first output associated with a first of said plurality of secondary windings, said resonant mode controller arranged to adjust the switching frequency of said bridge circuit so as to maintain said first output at a predetermined level;
a second output associated with a second of said plurality of secondary windings;
a secondary side capacitance element arranged in series between said second of said plurality of secondary windings and said second output;
an LED controller;
a first LED luminaire arranged to provide a first illumination responsive to a power signal on said second output; and
a first current regulator arranged to regulate current flowing through said first LED luminaire responsive to said LED controller,
wherein the second of said plurality of secondary windings exhibits a leakage inductance, and wherein the combination of the leakage inductance and capacitance of the secondary side capacitance element forms a resonant circuit with a resonance greater than a maximum switching frequency of said bridge circuit.

2. The circuit according to claim 1, wherein said first current regulator comprises a first electronically controlled switch arranged to be alternately in a closed state and an open state responsive to said LED controller, said first LED luminaire arranged to provide the first illumination when said first electronically controlled switch is in a first of said closed and open states and not provide the first illumination when said first electronically controlled switch is in a second of said closed and open states, and
wherein said LED controller is arranged to alternately set said first electronically controlled switch in said first state and said second state in synchronization with said switching of said bridge circuit.

3. The circuit according to claim 2, wherein said second output power signal exhibits an active portion which provides sufficient voltage to provide the first illumination and an inactive portion which does not provide sufficient voltage to provide the first illumination, and wherein said LED controller is arranged to synchronize said alternate opening and closing of said first electronically controlled switch with leading edge modulation such that said first electronically controlled switch is switched to the second of said closed and open states, from the first of said open and closed states, from the first of said closed and open states, in synchronization with said second output power signal inactive portion.

4. The circuit according to claim 2, wherein said second output power signal exhibits an active portion which provides sufficient voltage to provide the first illumination and an inactive portion which does not provide sufficient voltage to provide the first illumination, and wherein said LED controller is arranged to synchronize said alternate opening and closing of said first electronically controlled switch with falling edge modulation such that said first electronically controlled switch is switched to the first of said closed and open states, from the second of said closed and open states, during said second output power signal inactive portion in synchronization with the beginning of said second output power signal active portion.

5. The circuit according to claim 2, further comprising:
a second current regulator, said second current regulator comprising a second electronically controlled switch arranged to be alternately in a closed state and an open state responsive to said LED controller; and
a second LED luminaire coupled in parallel with said first LED luminaire, said second LED luminaire arranged in cooperation with said second electronically controlled switch to provide a second illumination therefrom responsive to the power signal from said second output when said second electronically controlled switch is in a first of said closed and open states and not provide the second illumination when said second electronically controlled switch is in a second of said closed and open states,
wherein said second output power signal exhibits an active portion which provides sufficient voltage to provide the second illumination and an inactive portion which does not provide sufficient voltage to provide the second illumination,
wherein said LED controller is arranged to synchronize said alternate closing and opening of said first electronically controlled switch with leading edge modulation such that said first electronically controlled switch is switched to the second of said closed and open states, from the first of said closed and open states, in synchronization with said second output power signal inactive portion, and
wherein said LED controller is arranged to synchronize said alternate opening and closing of said second electronically controlled switch with falling edge modulation such that said second electronically controlled switch is switched to the first of said closed and open states, from the second of said closed and open states, during said second output power signal inactive portion in synchronization with the beginning of said second output power signal active portion.

6. The circuit of claim 5, wherein said LED controller is arranged to identify which of a plurality of LED luminaires responsive thereto is the first LED luminaire, to be controlled with leading edge modulation, and which is the second LED luminaire, to be controlled with falling edge modulation, responsive to an electrical characteristic of each of said first and second LED luminaires.

7. A method of driving at least one light emitting diode (LED) luminaire, said method comprising:
switching a bridge circuit so as to produce a first output power signal, associated with a first of a plurality of secondary windings of a transformer, each of the plurality of secondary windings of the transformer magnetically coupled to a primary winding of the transformer, the primary winding of the transformer coupled to a primary side capacitance element;
controlling the frequency of the bridge circuit switching so as to maintain the first output power signal at a predetermined level, by reducing the switching frequency responsive to a falling first output power signal and increasing the switching frequency responsive to a rising first output power signal;
responsive to said increasing of the switching frequency, a leakage inductance of a second of the plurality of secondary windings, and the capacitance of a secondary side capacitance element arranged in series between a second output and the second of the plurality of secondary windings, decreasing an impedance presented to the second of the plurality of secondary windings;

responsive to said decreasing of the switching frequency, the leakage inductance of the second of the plurality of secondary windings, and the capacitance of the secondary side capacitance element, increasing the impedance presented to the second of the plurality of secondary windings;

enabling a first LED luminaire to provide a first illumination responsive to a second power signal on the second output; and regulating said provided first illumination.

8. The method according to claim 7, wherein said frequency controlling is between a predetermined minimum resonant frequency of a resonant mode controller and a predetermined maximum resonant frequency of the resonant mode controller, and wherein the secondary side capacitance element and the leakage inductance of the second of the plurality of secondary windings form a secondary side resonant circuit exhibiting a resonant frequency greater than the predetermined maximum resonant frequency of the resonant mode controller.

9. The method according to claim 7, wherein said regulating said provided first illumination comprises alternately enabling the first LED luminaire to provide the first illumination and disabling the first LED luminaire so as not to provide the first illumination, the method further comprising synchronizing said alternate enabling and disabling of the first LED luminaire with said switching of said bridge circuit.

10. The method according to claim 9, wherein the second output power signal exhibits an active portion which provides sufficient voltage to provide the first illumination and an inactive portion which does not provide sufficient voltage to provide the first illumination, and wherein said synchronizing comprises leading edge modulation such that said disabling of the first illumination is in synchronization with the second output power signal inactive portion.

11. The method according to claim 9, wherein the second output power signal exhibits an active portion which provides sufficient voltage to provide the first illumination and an inactive portion which does not provide sufficient voltage to provide the first illumination, and wherein said synchronizing comprises falling edge modulation such that said enabling of the first illumination is during the second output power signal inactive portion in synchronization with the beginning of the second output power signal active portion.

12. The method according to claim 9, further comprising alternately enabling a second LED luminaire, coupled in parallel with the first LED luminaire, to provide a second illumination from the second power signal and disabling the second LED luminaire so as not to provide the second illumination, wherein the second output power signal exhibits an active portion which provides sufficient voltage to provide one of the first and the second illumination and an inactive portion which does not provide sufficient voltage to provide any of the first and the second illumination, wherein said synchronizing of the first LED luminaire comprises leading edge modulation such that said disabling of the first illumination is in synchronization with the second output power signal inactive portion, and wherein said alternate enabling and disabling of the second LED luminaire comprises falling edge modulation synchronized with said switching of the bridge circuit such that said enabling of the second illumination is during the second output power signal inactive portion in synchronization with the beginning of the second output power signal active portion.

13. The method of claim 12, further comprising identifying which of a plurality of LED luminaires responsive thereto is the first LED luminaire, to be controlled with leading edge modulation, and which is the second LED luminaire, to be controlled with falling edge modulation, responsive to an electrical characteristic of each of said first and second LED luminaires.

* * * * *